(12) United States Patent
Wang et al.

(10) Patent No.: US 12,343,623 B2
(45) Date of Patent: Jul. 1, 2025

(54) VIRTUAL OBJECT CONTROL METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Yang Wang, Shenzhen (CN); Lijie Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 271 days.

(21) Appl. No.: 17/981,320

(22) Filed: Nov. 4, 2022

(65) Prior Publication Data

US 2023/0057151 A1    Feb. 23, 2023

Related U.S. Application Data

(63) Continuation of application No. PCT/CN2021/141743, filed on Dec. 27, 2021.

(30) Foreign Application Priority Data

Jan. 21, 2021    (CN) .......................... 202110082390.1

(51) Int. Cl.
*A63F 13/52*    (2014.01)
*A63F 13/56*    (2014.01)

(52) U.S. Cl.
CPC .............. *A63F 13/52* (2014.09); *A63F 13/56* (2014.09)

(58) Field of Classification Search
CPC .............. A63F 13/537; A63F 13/5372; A63F 13/5375; A63F 13/5378; A63F 13/55;
(Continued)

(56) References Cited

U.S. PATENT DOCUMENTS

| 4,445,011 A | * | 4/1984 | Hansen | ................. | H01H 9/0214 |
| | | | | | 200/224 |
| 4,817,950 A | * | 4/1989 | Goo | ....................... | A63F 13/807 |
| | | | | | 482/901 |

(Continued)

FOREIGN PATENT DOCUMENTS

| CN | 105607845 A | 5/2016 |
| CN | 108553885 A | 9/2018 |

(Continued)

OTHER PUBLICATIONS

Tencent Technology, WO, PCT/CN2021/141743, Mar. 28, 2022, 4 pgs.

(Continued)

*Primary Examiner* — Omkar A Deodhar
*Assistant Examiner* — Matthew D Hoel
(74) *Attorney, Agent, or Firm* — Morgan, Lewis & Bockius LLP

(57) ABSTRACT

A virtual object control method is performed by a computer device. The method includes: displaying a virtual scene picture corresponding to a virtual scene, the virtual scene including a first virtual object; controlling the first virtual object to launch a target virtual projectile, the target virtual projectile being configured to trigger a virtual gravitational source in the virtual scene; and, when a distance between a second virtual object and the virtual gravitational source is less than a distance threshold, controlling the second virtual object to move toward the virtual gravitational source. This solution provides a method for quickly gathering second virtual objects to a specified position, so as to realize control on a plurality of second virtual objects by a first virtual object, and shorten a duration of a single-round battle, thereby reducing the power consumption of a terminal and saving data traffic.

20 Claims, 8 Drawing Sheets

(58) Field of Classification Search
CPC .......... A63F 13/56; A63F 13/57; A63F 13/52; A63F 13/837
See application file for complete search history.

(56) References Cited

U.S. PATENT DOCUMENTS

| | | | | |
|---|---|---|---|---|
| 5,577,185 A * | 11/1996 | Tunnell | ............... | G06T 13/80 463/9 |
| 5,695,406 A * | 12/1997 | Park | ............... | A47C 7/723 472/130 |
| 5,846,134 A * | 12/1998 | Latypov | ............... | A63F 13/00 463/31 |
| 5,910,797 A * | 6/1999 | Beuk | ............... | G06F 1/1694 345/157 |
| 6,217,449 B1 * | 4/2001 | Kaku | ............... | G06F 3/01 463/7 |
| 6,590,536 B1 * | 7/2003 | Walton | ............... | G01S 3/146 342/463 |
| 7,424,388 B2 * | 9/2008 | Sato | ............... | A63F 13/211 463/31 |
| 7,872,638 B2 * | 1/2011 | Sato | ............... | G06T 13/00 463/36 |
| 7,907,838 B2 * | 3/2011 | Nasiri | ............... | A63F 13/428 396/55 |
| 7,988,558 B2 * | 8/2011 | Sato | ............... | A63F 13/211 463/37 |
| 8,079,251 B2 * | 12/2011 | Miyanaga | ............... | G01G 23/3735 73/65.01 |
| 8,152,640 B2 * | 4/2012 | Shirakawa | ............... | A63F 13/214 463/31 |
| 8,337,307 B2 * | 12/2012 | Uchida | ............... | A63F 13/814 463/36 |
| 8,395,582 B2 * | 3/2013 | Takayama | ............... | G01G 19/44 345/158 |
| 8,523,646 B2 * | 9/2013 | Morimoto | ............... | A63F 13/57 463/6 |
| 8,654,073 B2 * | 2/2014 | Konishi | ............... | A63F 13/428 345/156 |
| 8,751,179 B2 * | 6/2014 | Hayashi | ............... | A63F 13/428 702/94 |
| 9,049,948 B2 * | 6/2015 | Jongen | ............... | H04W 4/023 |
| 9,050,525 B2 * | 6/2015 | Dohta | ............... | G06F 3/0346 |
| 9,067,137 B2 * | 6/2015 | Ogasawara | ......... | A63F 13/5255 |
| 9,120,012 B2 * | 9/2015 | Akimoto | ............... | A63F 13/00 |
| 9,205,327 B2 * | 12/2015 | Hayashi | ............... | A63F 13/44 |
| 9,421,456 B2 * | 8/2016 | Okamoto | ............... | A63F 13/235 |
| 9,480,918 B2 * | 11/2016 | Hayashi | ............... | A63F 13/218 |
| 9,482,554 B2 * | 11/2016 | Cook | ............... | G01C 25/005 |
| 9,561,442 B2 * | 2/2017 | Shimizu | ............... | A63F 13/42 |
| 9,604,136 B1 * | 3/2017 | Ricky | ............... | A63B 69/3623 |
| 9,703,417 B2 * | 7/2017 | Taki | ............... | G06F 3/0354 |
| 9,989,924 B2 * | 6/2018 | Huang | ............... | G06F 1/1694 |
| 10,010,794 B2 * | 7/2018 | Dancau | ............... | A63F 13/5372 |
| 10,124,211 B2 * | 11/2018 | Scholl | ............... | G09B 19/0038 |
| 10,307,670 B2 * | 6/2019 | Lee | ............... | A63F 13/245 |
| 10,345,896 B2 * | 7/2019 | Schmidt | ............... | A63F 13/211 |
| 10,729,025 B1 * | 7/2020 | Hung | ............... | H05K 5/03 |
| 10,777,006 B2 * | 9/2020 | Bashkirov | ............... | G06F 3/012 |
| 10,864,552 B2 * | 12/2020 | Shoji | ............... | H04M 19/04 |
| 10,994,216 B2 * | 5/2021 | Board | ............... | A63F 13/65 |
| 11,036,299 B2 * | 6/2021 | Choi | ............... | A63F 13/285 |
| 11,117,047 B2 * | 9/2021 | Lin | ............... | A63F 13/213 |
| 11,117,054 B2 * | 9/2021 | Kojima | ............... | A63F 13/35 |
| 11,819,763 B2 * | 11/2023 | Liu | ............... | A63F 13/426 |
| 11,951,407 B2 * | 4/2024 | Song | ............... | A63B 71/0622 |
| 12,034,909 B2 * | 7/2024 | Elbakly | ............... | G01C 25/00 |
| 12,131,417 B1 * | 10/2024 | Malia | ............... | A63F 13/213 |
| 2019/0272707 A1 | 9/2019 | Washington et al. | | |
| 2019/0381403 A1 | 12/2019 | Lin et al. | | |
| 2020/0298121 A1 | 9/2020 | Deng | | |
| 2022/0379209 A1 * | 12/2022 | Yao | ............... | A63F 13/837 |

FOREIGN PATENT DOCUMENTS

| | | |
|---|---|---|
| CN | 111544889 A | 8/2020 |
| CN | 111589150 A | 8/2020 |
| CN | 111714886 A | 9/2020 |
| CN | 112107858 A | 12/2020 |
| CN | 112402964 A | 2/2021 |
| CN | 112717410 A | 4/2021 |
| JP | 2019136358 A | 8/2019 |
| JP | 2020039403 A | 3/2020 |
| JP | 2020534615 A | 11/2020 |
| TW | 200806369 A | 2/2008 |

OTHER PUBLICATIONS

Tencent Technology, IPRP, PCT/CN2021/141743, Jul. 20, 2023, 5 pgs.
Gypsophila, "'Honkai 3' Sky Ranger Skill Analysis and Gameplay Recommendation", Kalvin.cn, Aug. 9, 2019, 6 pgs., Retrieved from the Internet: https://www.kalvin.cn/gl/8617.html.
Honkai III 985 Planning, "Collapse 3 Sky Ranger How to Play Sky Ranger Skill Analysis", Doyo.cn, Jul. 30, 2019, 7 pgs., Retrieved from the Internet: https://www.doyo.cn/news/1642.html.
Tencent Technology, ISR, PCT/CN2021/141743, Mar. 28, 2022, 3 pgs.
Famitsu.com, "Dissidia: Final Fantasy. Y'shtola Basic Information", Nov. 2018, Retrieved from the Internet: https://www.famitsu.com/matome/dff/character14.html.

* cited by examiner

VIRTUAL OBJECT CONTROL METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2021/141743, entitled "VIRTUAL OBJECT CONTROL METHOD AND APPARATUS, AND DEVICE, STORAGE MEDIUM AND PROGRAM PRODUCT" filed on Dec. 27, 2021, which claims priority to Chinese Patent Application No. 202110082390.1, filed with the State Intellectual Property Office of the People's Republic of China on Jan. 21, 2021, and entitled "VIRTUAL OBJECT CONTROL METHOD AND APPARATUS, AND DEVICE, STORAGE MEDIUM AND PROGRAM PRODUCT", all of which are incorporated herein by reference in their entirety.

FIELD OF THE TECHNOLOGY

This application relates to the field of virtual scene technologies, and in particular, to a virtual object control method and apparatus, a device, a storage medium, and a program product.

BACKGROUND OF THE DISCLOSURE

Currently, in a battle game, a user may control a virtual object to use a virtual prop to launch a virtual projectile to attack other virtual objects, so as to eliminate the other virtual objects.

Conventionally, when the virtual projectile launched by the virtual prop is in contact with other virtual objects on a launch path, it means that the virtual projectile hits the other virtual objects, and hit points of the hit virtual objects will be decreased by a specified value.

However, after the virtual projectile launched by the virtual prop hits other virtual objects, only the hit virtual objects are damaged, which makes it take a relatively long time to end a single-round battle by eliminating other virtual objects, and wastes power of the terminal and data traffic.

SUMMARY

Embodiments of this application provide a virtual object control method and apparatus, a device, a storage medium, and a program product. The technical solutions are as follows:

According to an aspect, an embodiment of this application provides a virtual object control method, including:
  displaying a virtual scene picture corresponding to a virtual scene, the virtual scene including a first virtual object;
  controlling the first virtual object to launch a target virtual projectile, the target virtual projectile being configured to trigger a virtual gravitational source in the virtual scene; and
  when a distance between a second virtual object and the virtual gravitational source is less than a distance threshold, controlling the second virtual object to move toward the virtual gravitational source.

According to an aspect, an embodiment of this application provides a virtual object control method, including:
  displaying a first virtual scene picture corresponding to a virtual scene, the first virtual scene picture including a first virtual object;
  displaying a second virtual scene picture when the first virtual object launches a target virtual projectile, the second virtual scene picture including a virtual gravitational source, the virtual gravitational source being generated based on a position of the target virtual projectile; and
  when a distance between a second virtual object and the virtual gravitational source is less than a distance threshold, controlling the second virtual object to move toward the virtual gravitational source.

According to another aspect, an embodiment of this application provides a virtual object control apparatus, including:
  a display module, configured to display a virtual scene picture corresponding to a virtual scene, the virtual scene including a first virtual object;
  a launch module, configured to control the first virtual object to launch a target virtual projectile, the target virtual projectile being configured to trigger a virtual gravitational source in the virtual scene; and
  a movement module, configured to, when a distance between a second virtual object and the virtual gravitational source is less than a distance threshold, control the second virtual object to move toward the virtual gravitational source.

In a possible implementation, the apparatus further includes:
  a generation module, configured to generate the virtual gravitational source based on a position of the target virtual projectile.

In a possible implementation, the generation module includes:
  a first trajectory acquisition submodule, configured to acquire a first movement trajectory of the target virtual projectile when the first virtual object launches the target virtual projectile;
  a first position determining submodule, configured to determine a first trigger position based on the first movement trajectory of the target virtual projectile, the first trigger position being a maximum range position when no collision occurs during movement of the target virtual projectile along the first movement trajectory, or a position at which the target virtual projectile collides with an obstacle; and
  a gravitational source generation submodule, configured to generate the virtual gravitational source at the first trigger position.

In a possible implementation, the gravitational source generation submodule includes:
  a first generation unit, configured to generate the virtual gravitational source at the first trigger position when a volume of surrounding space of the first trigger position is greater than or equal to a volume of the virtual gravitational source.

In a possible implementation, the gravitational source generation submodule includes:
  a second position determining unit, configured to determine a second trigger position when a volume of surrounding space of the first trigger position is less than a volume of the virtual gravitational source, the second trigger position being a position on the first movement trajectory and for which a volume of surrounding space is greater than or equal to the volume of the virtual gravitational source; and a second generation unit, configured to generate the virtual gravitational source at the second trigger position.

In a possible implementation, the movement module includes:
a straight line determining submodule, configured to connect a position of the second virtual object and a center position of the virtual gravitational source when the distance between the second virtual object and the virtual gravitational source is less than the distance threshold, to determine a linear motion trajectory;
a second trajectory determining submodule, configured to determine a second movement trajectory corresponding to the second virtual object based on the linear motion trajectory; and
a movement control submodule, configured to control, based on the second movement trajectory, the second virtual object to move toward the virtual gravitational source.

In a possible implementation, the second trajectory determining submodule includes:
a position point acquisition unit, configured to acquire a highest position point and a lowest position point of the second virtual object in a vertical direction;
a region acquisition unit, configured to respectively draw a parallel line of the linear motion trajectory based on the highest position point and the lowest position point, to obtain a motion region of the second virtual object during movement along the linear motion trajectory; and
a second trajectory determining unit, configured to determine the second movement trajectory corresponding to the second virtual object based on an existence situation of an obstacle in the motion region.

In a possible implementation, the second trajectory determining unit is configured to:
determine the linear motion trajectory as the second movement trajectory corresponding to the second virtual object when no obstacle exists in the motion region.

In a possible implementation, the second trajectory determining unit is configured to:
determine the linear motion trajectory between the position of the second virtual object and the obstacle as a first trajectory segment when the obstacle exists in the motion region;
acquire a correction trajectory at which the obstacle is bypassed based on a gravitational direction of the virtual gravitational source;
connect an end position of the correction trajectory and the center position of the virtual gravitational source, to generate a second trajectory segment; and
determine the second movement trajectory corresponding to the second virtual object based on the first trajectory segment, the correction trajectory, and the second trajectory segment.

In a possible implementation, the movement module includes:
a first distance acquisition submodule, configured to acquire a first distance between a position of the second virtual object and a center position of the virtual gravitational source;
an initial speed determining submodule, configured to determine, based on the first distance, an initial speed at which the second virtual object moves, the initial speed being negatively correlated with the first distance; and a movement submodule, configured to control the second virtual object to move toward the center position of the virtual gravitational source at the initial speed and a first acceleration.

In a possible implementation, the apparatus further includes:
an effect addition module, configured to: when a duration for which the virtual gravitational source exists in the virtual scene reaches a first duration, add an explosion effect to a position corresponding to the virtual gravitational source, and remove the virtual gravitational source.

In a possible implementation, the apparatus further includes:
a second distance acquisition module, configured to acquire a second distance between a position of the second virtual object and a center position of the virtual gravitational source when the duration for which the virtual gravitational source exists in the virtual scene reaches the first duration; and
an attribute modification module, configured to modify a first attribute value of the second virtual object based on the second distance, the second distance being negatively correlated with a modified value of the first attribute value.

In a possible implementation, the apparatus further includes:
a reverse movement module, configured to control, when the duration for which the virtual gravitational source exists in the virtual scene reaches the first duration, the second virtual object to move toward an opposite direction of a gravitational force provided by the virtual gravitational source.

In a possible implementation, the apparatus further includes:
an attribute zeroing module, configured to modify the first attribute value of the second virtual object to 0 when the second virtual object moves to the center position of the virtual gravitational source.

According to another aspect, an embodiment of this application provides a virtual object control apparatus, including:
a first display module, configured to display a first virtual scene picture corresponding to a virtual scene, the first virtual scene picture including a first virtual object;
a second display module, configured to display a second virtual scene picture when the first virtual object launches a target virtual projectile, the second virtual scene picture including a virtual gravitational source, the virtual gravitational source being generated based on a position of the target virtual projectile; and
a movement module, configured to control, when a distance between a second virtual object and the virtual gravitational source is less than a distance threshold, the second virtual object to move toward the virtual gravitational source.

In a possible implementation, the movement module includes:
a direction confirmation submodule, configured to acquire, when the distance between the second virtual object and the virtual gravitational source is less than the distance threshold, a first direction that a center position of the virtual gravitational source faces relative to the second virtual object;
an action acquisition submodule, configured to determine, based on the first direction, a first action of the second virtual object during movement toward the center position of the virtual gravitational source; and a movement submodule, configured to control, based on the first action, the second virtual object to move toward the center position of the virtual gravitational source.

According to another aspect, an embodiment of this application provides a computer device, including a processor and a memory, the memory storing at least one instruction, the at least one instruction being loaded and executed by the processor and causing the computer device to implement the virtual object control method described in the foregoing aspect.

According to another aspect, an embodiment of this application provides a non-transitory computer-readable storage medium, storing at least one instruction, the at least one instruction being loaded and executed by a processor of a computer device and causing the computer device to implement the virtual object control method described in the foregoing aspect.

According to an aspect of this application, a computer program product or a computer program is provided, the computer program product or the computer program including computer instructions, the computer instructions being stored in a computer-readable storage medium. A processor of a terminal reads the computer instructions from the computer-readable storage medium, and executes the computer instructions, to cause the terminal to perform the virtual object control method provided in the optional implementations of the foregoing aspect.

The technical solutions provided in the embodiments of this application have at least the following beneficial effects:

In the embodiments of this application, a computer device controls a first virtual object to launch a target virtual projectile, the target virtual projectile being configured to trigger a virtual gravitational source in a virtual scene, so that when a second virtual object is within a function range of the virtual gravitational source, the computer device controls the second virtual object to move toward the virtual gravitational source. By using the foregoing method, a solution for quickly gathering second virtual objects to a specified position is provided. By controlling the first virtual object to launch the target virtual projectile, second virtual objects within a specified range are controlled to move toward the same position, so as to realize simultaneous interaction between the first virtual object and a plurality of second virtual objects, and shorten a duration of a single-round battle, thereby reducing the power consumption of a terminal and saving data traffic.

BRIEF DESCRIPTION OF THE DRAWINGS

Accompanying drawings herein are incorporated into the specification and constitute a part of this specification, show embodiments that conform to this application, and are used for describing a principle of this application together with this specification.

DESCRIPTION OF EMBODIMENTS

Figure 1:
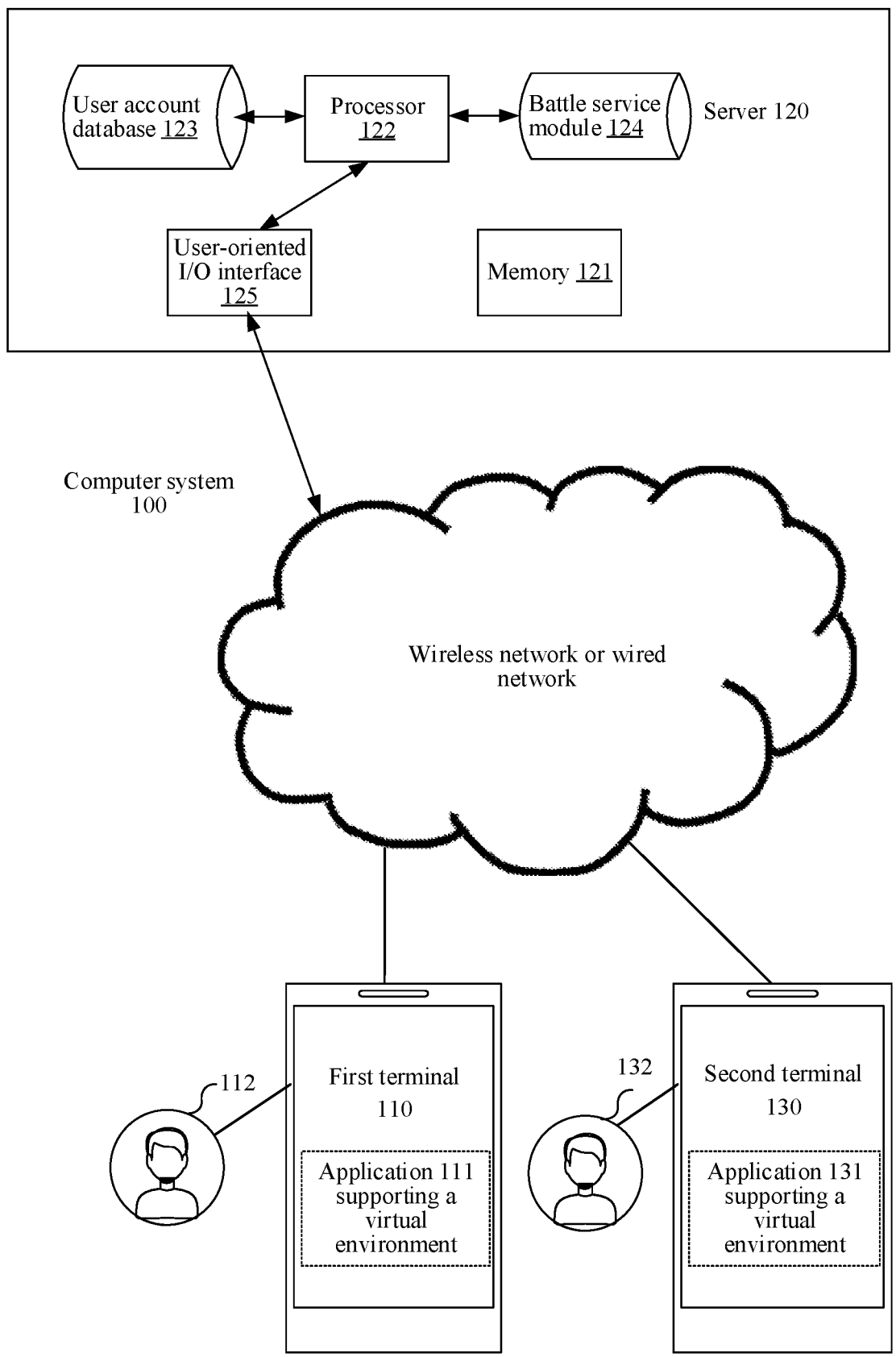
FIG. 1 is a schematic diagram of a virtual object control system according to an exemplary embodiment of this application.

Exemplary embodiments are described in detail herein, and examples thereof are shown in the accompanying drawings. When the following descriptions are made with reference to the accompanying drawings, unless indicated otherwise, same numbers in different accompanying drawings represent the same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application.

Virtual scene: It is a virtual scene displayed (or provided) when an application is run on a terminal. The virtual scene may be a simulated environment scene of a real world, or may be a semi-simulated semi-fictional three-dimensional environment scene, or may be an entirely fictional three-dimensional environment scene. The virtual scene may be any one of a two-dimensional virtual scene, a 2.5-dimensional virtual scene, and a three-dimensional virtual scene, and description is made by using an example in which the virtual scene is a three-dimensional virtual scene in the following embodiments, but this is not limited. In some embodiments, the virtual scene may be further used for a virtual scene battle between at least two virtual roles. In some embodiments, the virtual scene may be further used for a battle performed between at least two virtual roles by using virtual props. In some embodiments, the virtual scene may be further used for a battle performed between at least two virtual roles by using virtual props in a range of a target region, and the range of the target region may be continuously decreased as time goes by in the virtual scene.

Virtual object: It is a movable object in a virtual scene. The movable object may be at least one of a virtual person, a virtual animal, and a virtual vehicle. In some embodiments, when the virtual scene is a three-dimensional virtual scene, the virtual object is a three-dimensional model created based on a skeletal animation technology. Each virtual object has a shape, a volume and an orientation in the three-dimensional virtual scene, and occupies some space in the three-dimensional virtual scene.

The virtual scene is generally generated by an application in a computer device such as a terminal and displayed based on hardware (for example, a screen) in the terminal. The terminal may be a mobile terminal such as a smartphone, a tablet computer, or an ebook reader. Alternatively, the terminal may be a personal computer device such as a notebook computer or a fixed computer.

Virtual prop: It is a prop that a virtual object can use in a virtual environment, including an offensive prop that can cause damage to other virtual objects, a supply prop that provides supplies for an offensive prop, which can be mounted on a specified offensive prop, a virtual pendant that provides some attribute bonuses to an offensive prop, or a defensive prop that resists or buffers the damage from a virtual weapon.

First-person game: It is a game in which a user can play from a first-person perspective. A virtual environment picture in the game is a picture obtained by observing a virtual environment from a perspective of a first virtual object. In the game, at least two virtual objects play in a single-round battle mode in the virtual environment. The virtual object eludes damages from other virtual objects and dangers (for example, a poison gas area and a swamp) in the virtual environment to survive in the virtual environment. When a health point of the virtual object in the virtual environment is zero, the life of the virtual object in the virtual environment ends, and the final virtual object surviving in the virtual environment wins. In some embodiments, the battle starts with a moment when the first client joins the battle, and ends with a moment when the last client exits the battle. Each client may control one or more virtual objects in the virtual environment. In some embodiments, arena modes of the battle may include a single-player battle mode, a two-player team battle mode, or a multiplayer team battle mode. The battle mode is not limited in the embodiments of this application.

FIG. 1 is a schematic diagram of a virtual object control system according to an embodiment of this application. The system may include: a first terminal 110, a server 120, and a second terminal 130.

An application 111 supporting a virtual environment is installed and run on the first terminal 110, and the application 111 may be a multiplayer online battle program. When the first terminal runs the application 111, a user interface of the application 111 is displayed on a screen of the first terminal 110. The application 111 may be any one of a multiplayer online battle arena (MOBA) game, a battle royale battle game, a simulation game (SLG), and a first-person game. In this embodiment, an example in which the application 111 is a first-person game is used for description. The first terminal 110 is a terminal used by a first user 112. The first user 112 uses the first terminal 110 to control a first virtual object located in the virtual environment to perform activities, and the first virtual object may be referred to as a master virtual object of the first user 112. The activities of the first virtual object include, but not limited to: at least one of adjusting body postures, crawling, walking, running, riding, flying, jumping, driving, picking, launching virtual projectiles, attacking, throwing, and skill casting. For example, the first virtual object is a first virtual person such as a simulated person or a cartoon person.

An application 131 supporting a virtual environment is installed and run on the second terminal 130, and the application 131 may be a multiplayer online battle program. When the second terminal 130 runs the application 131, a user interface of the application 131 is displayed on a screen of the second terminal 130. The client may be any one of a MOBA game, a battle royale battle game, an SLG, and a first-person game. In this embodiment, an example in which the application 131 is a first-person shooting (FPS) game is used for description. The second terminal 130 is a terminal used by a second user 132. The second user 132 uses the second terminal 130 to control a second virtual object located in the virtual environment to perform activities, and the second virtual object may be referred to as a master virtual character of the second user 132. For example, the second virtual object is a second virtual person, such as a simulated person or a cartoon person.

In some embodiments, the first virtual object and the second virtual object are located in the same virtual world.

In some embodiments, the first virtual object and the second virtual object may belong to the same camp, the same team, or the same organization, have a friend relationship with each other, or have a temporary communication permission. In some embodiments, the first virtual object and the second virtual object may belong to different camps, different teams, or different organizations, or have a hostile relationship with each other.

In some embodiments, the applications installed on the first terminal 110 and the second terminal 130 are the same, or the applications installed on the two terminals are the same type of applications on different operating system platforms (Android system or iOS system). The first terminal 110 may generally refer to one of a plurality of terminals, and the second terminal 130 may generally refer to another one of the plurality of terminals. In this embodiment, only the first terminal 110 and the second terminal 130 are used as an example for description. Device types of the first terminal 110 and the second terminal 130 are the same or different. The device type includes at least one of a smartphone, a tablet computer, an ebook reader, a Moving Picture Experts Group Audio Layer III (MP3) player, a Moving Picture Experts Group Audio Layer IV (MP4) player, a laptop computer, and a desktop computer.

FIG. 1 shows only two terminals. However, a plurality of other terminals may access the server 120 in different embodiments. In some embodiments, one or more terminals are terminals corresponding to a developer. A developing and editing platform for the application supporting a virtual environment is installed on the terminal. The developer may edit and update the application on the terminal and transmit an updated application installation package to the server 120 through a wired or wireless network. The first terminal 110 and the second terminal 130 may download the application installation package from the server 120 to update the application.

The first terminal 110, the second terminal 130, and another terminal are connected to the server 120 through a wireless network or a wired network.

The server 120 includes at least one of one server, a server cluster including a plurality of servers, a cloud computing platform, and a virtualization center. The server 120 is configured to provide a backend service for an application supporting a three-dimensional virtual environment. In some embodiments, the server 120 takes on primary computing work, and the terminals take on secondary computing work. Alternatively, the server 120 takes on secondary computing work, and the terminals take on primary computing work.

Alternatively, collaborative computing is performed by using a distributed computing architecture between the server 120 and the terminals.

In a schematic example, the server 120 includes a memory 121, a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is used for storing data of user accounts used by the first terminal 110, the second terminal 130, and/or the another terminal, for example, profile pictures of the user accounts, nicknames of the user accounts, combat power indices of the user accounts, and service regions in which the user accounts are located. The battle service module 124 is configured to provide a plurality of battle rooms to users for a battle, for example, a 1V1 battle, a 3V3 battle, or a 5V5 battle. The user-oriented I/O interface 125 is configured to establish communication with the first terminal 110 and/or the second terminal 130 through a wireless network or wired network to exchange data.

Figure 2:
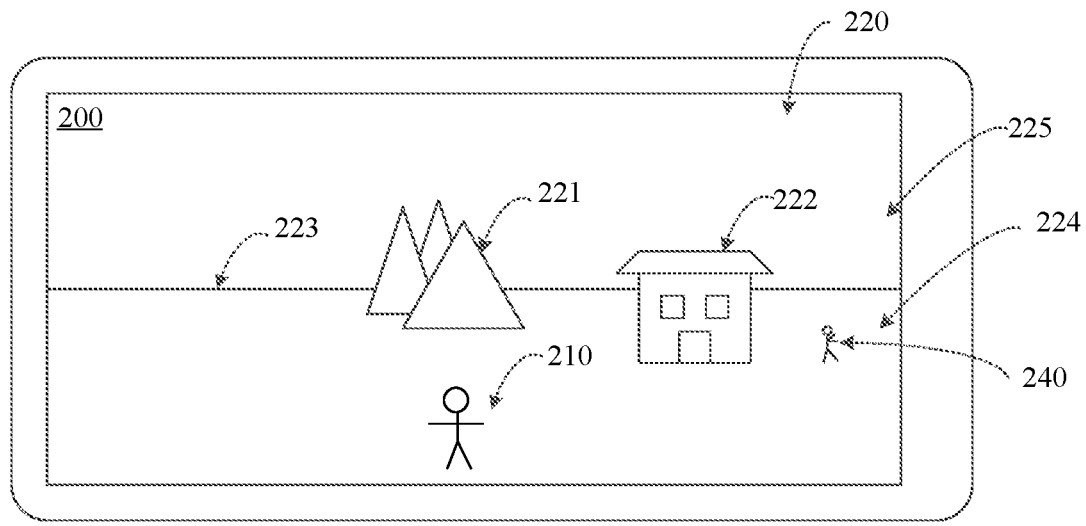
FIG. 2 is a schematic diagram of a display interface of a virtual scene according to an exemplary embodiment of this application.

The virtual scene may be a three-dimensional virtual scene, or the virtual scene may be a two-dimensional virtual scene. An example in which the virtual scene is a three-dimensional virtual scene is used. FIG. 2 is a schematic diagram of a display interface of a virtual scene according to an exemplary embodiment of this application. As shown in FIG. 2, the display interface of the virtual scene includes a scene picture 200, and the scene picture 200 includes a current controlled virtual object 210, an environment picture 220 of the three-dimensional virtual scene, and a virtual object 240. The virtual object 240 may be a virtual object controlled by a user corresponding to another terminal or a virtual object controlled by an application.

In FIG. 2, the current controlled virtual object 210 and the virtual object 240 are three-dimensional models in the three-dimensional virtual scene, and the environment picture of the three-dimensional virtual scene displayed in the scene picture 200 are objects observed from a perspective of the current controlled virtual object 210. For example, as shown in FIG. 2, under the observation from the perspective of the current controlled virtual object 210, the displayed environment picture 220 of the three-dimensional virtual scene includes the earth 224, the sky 225, the horizon 223, a hill 221, and a factory 222.

The current controlled virtual object 210 may cast a skill or use a virtual prop, move, and perform a specified action under the control of the user. The virtual object in the virtual scene under the control of the user may display different three-dimensional models. For example, the screen of the terminal supports a touch operation, and the scene picture 200 of the virtual scene includes a virtual control, then when the user touches the virtual control, the current controlled virtual object 210 may perform the specified action in the virtual scene and display the current corresponding three-dimensional model.

Based on the virtual object control method provided in this application, the computer device may display a virtual scene picture including a first virtual object; control the first virtual object to launch a target virtual projectile, the target virtual projectile being configured to trigger a virtual gravitational source in the virtual scene; and control, when a distance between a second virtual object and the virtual gravitational source is less than a distance threshold, the second virtual object to move toward the virtual gravitational source. In other words, after the first virtual object launches the target virtual projectile, the computer device may generate the virtual gravitational source based on a position of the target virtual projectile, to control, when it is determined that the distance between the second virtual object and the virtual gravitational source is less than the distance threshold, the second virtual object to move toward the virtual gravitational source.

Figure 3:
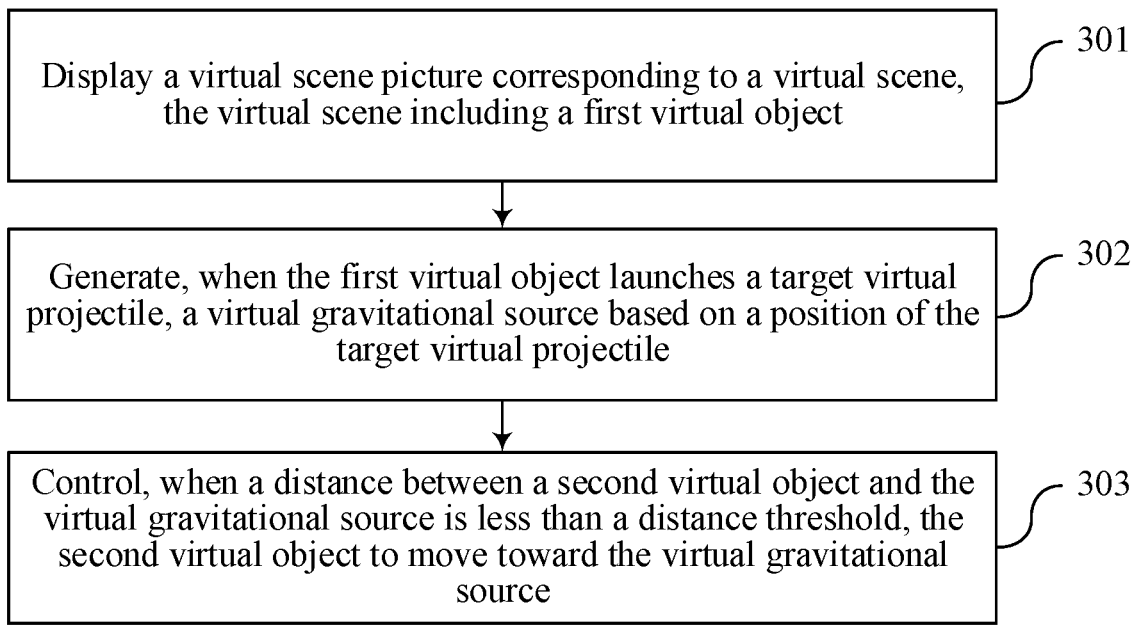
FIG. 3 is a schematic diagram of a virtual object control process according to an exemplary embodiment of this application.

FIG. 3 is a flowchart of a virtual object control method according to an exemplary embodiment of this application. The method may be performed by a computer device, where the computer device may be a terminal or a server, or the computer device may alternatively include the terminal and the server. As shown in FIG. 3, the computer device may control virtual objects by performing the following steps:

Step 301: Display a virtual scene picture corresponding to a virtual scene, the virtual scene including a first virtual object.

In this embodiment of this application, the computer device displays a virtual scene picture corresponding to a virtual scene.

The virtual scene picture may include a first virtual object, the first virtual object being a virtual object mastered by the computer device.

Step 302: Generate, when the first virtual object launches a target virtual projectile, a virtual gravitational source based on a position of the target virtual projectile.

In some embodiments, the generating the virtual gravitational source based on a position of the target virtual projectile includes: determining a generation position of the virtual gravitational source based on the position of the target virtual projectile; and generating the virtual gravitational source based on the generation position of the virtual gravitational source.

In this embodiment of this application, when the first virtual object launches a target virtual projectile, the computer device generates a virtual gravitational source based on a position of the target virtual projectile.

In a possible implementation, when the first virtual object launches a target virtual projectile, a virtual gravitational source is generated based on a position of the target virtual projectile during movement of the target virtual projectile.

The target virtual projectile is a virtual prop launched by the first virtual object and configured to attack other virtual objects. The target virtual projectile may be indirectly launched by the computer device by controlling the first virtual object and using a specified virtual prop; or the target virtual projectile may be directly launched or thrown by the computer device by controlling the first virtual object.

Step 303: Control, when a distance between a second virtual object and the virtual gravitational source is less than a distance threshold, the second virtual object to move toward the virtual gravitational source.

In this embodiment of this application, when acquiring that a second virtual object exists within a distance threshold range of the virtual gravitational source, the computer device controls the second virtual object within the distance threshold range to move toward the virtual gravitational source. The distance threshold range refers to a range in which the virtual gravitational source is used as a center, and has a distance to the virtual gravitational source less than the distance threshold. For example, the computer device acquires a distance between each second virtual object and the virtual gravitational source in the virtual scene, and controls a second virtual object with a distance less than the distance threshold to move toward the virtual gravitational source; or the computer device acquires a spherical range with the virtual gravitational source as a center and the distance threshold as a radius, acquires a second virtual object existing within the spherical range, and controls the second virtual object within the spherical range to move toward the virtual gravitational source.

The second virtual object may be any virtual object in the virtual scene. For example, the second virtual object may be a virtual object in the same camp as the first virtual object, or may be a virtual object in a different camp with the first virtual object, or may even be the first virtual object.

Based on the above, in the solution shown in this embodiment of this application, a first virtual object is controlled to launch a target virtual projectile, and a virtual gravitational source is generated based on a position of the target virtual projectile, so that when a second virtual object is within a function range of the virtual gravitational source, the second virtual object is controlled to move toward the virtual gravitational source. By using the foregoing method, a solution for quickly gathering second virtual objects to a specified position is provided. By controlling the first virtual object to launch the target virtual projectile, second virtual objects within a specified range are controlled to move toward the same position, so as to realize control on a plurality of second virtual objects by the first virtual object, and shorten a duration of a single-round battle, thereby reducing the power consumption of a terminal and saving data traffic.

In some embodiments, after the second virtual objects within the specified range are gathered to the same position through the virtual gravitational source, a centralized operation on the plurality of second virtual objects can be realized, thereby reducing the steps and operation procedures of operating the plurality of virtual objects one by one, which further shortens a duration of a single-round battle, thereby reducing the power consumption of a terminal and saving data traffic.

Figure 4:
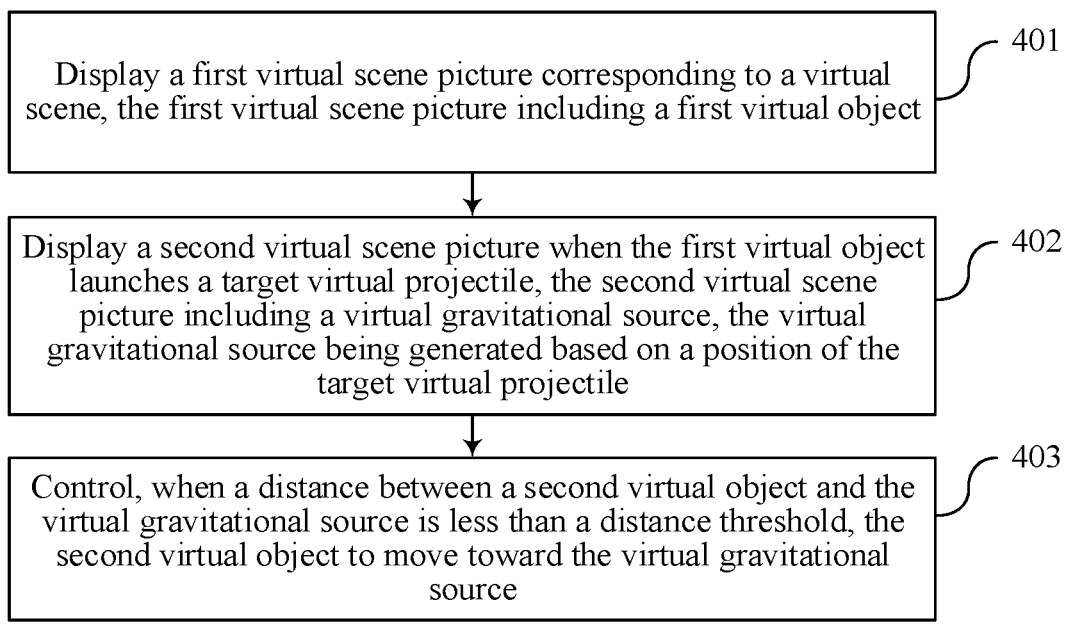
FIG. 4 is a flowchart of a virtual object control method according to an exemplary embodiment of this application.

FIG. 4 is a flowchart of a virtual object control method according to an exemplary embodiment of this application. The method may be performed by a computer device, where the computer device may be a terminal or a server, or the computer device may alternatively include the terminal and the server. As shown in FIG. 4, the computer device may control virtual objects by performing the following steps:

Step 401: Display a first virtual scene picture corresponding to a virtual scene, the first virtual scene picture including a first virtual object.

Step 402: Display a second virtual scene picture when the first virtual object launches a target virtual projectile, the second virtual scene picture including a virtual gravitational source, the virtual gravitational source being generated based on a position of the target virtual projectile.

Step 403: Control, when a distance between a second virtual object and the virtual gravitational source is less than a distance threshold, the second virtual object to move toward the virtual gravitational source.

Based on the above, in the solution shown in this embodiment of this application, a first virtual object is controlled to launch a target virtual projectile, and a virtual gravitational source is generated based on a position of the target virtual projectile, so that when a second virtual object is within a function range of the virtual gravitational source, the second virtual object is controlled to move toward the virtual gravitational source. By using the foregoing method, a solution for quickly gathering second virtual objects to a specified position is provided. By controlling the first virtual object to launch the target virtual projectile, second virtual objects within a specified range are controlled to move toward the same position, so as to realize simultaneous control interaction between the first virtual object and a plurality of second virtual objects, and shorten a duration of a single-round battle through a centralized operation on the second virtual objects subsequently, thereby reducing the power consumption of a terminal and saving data traffic.

Figure 5:
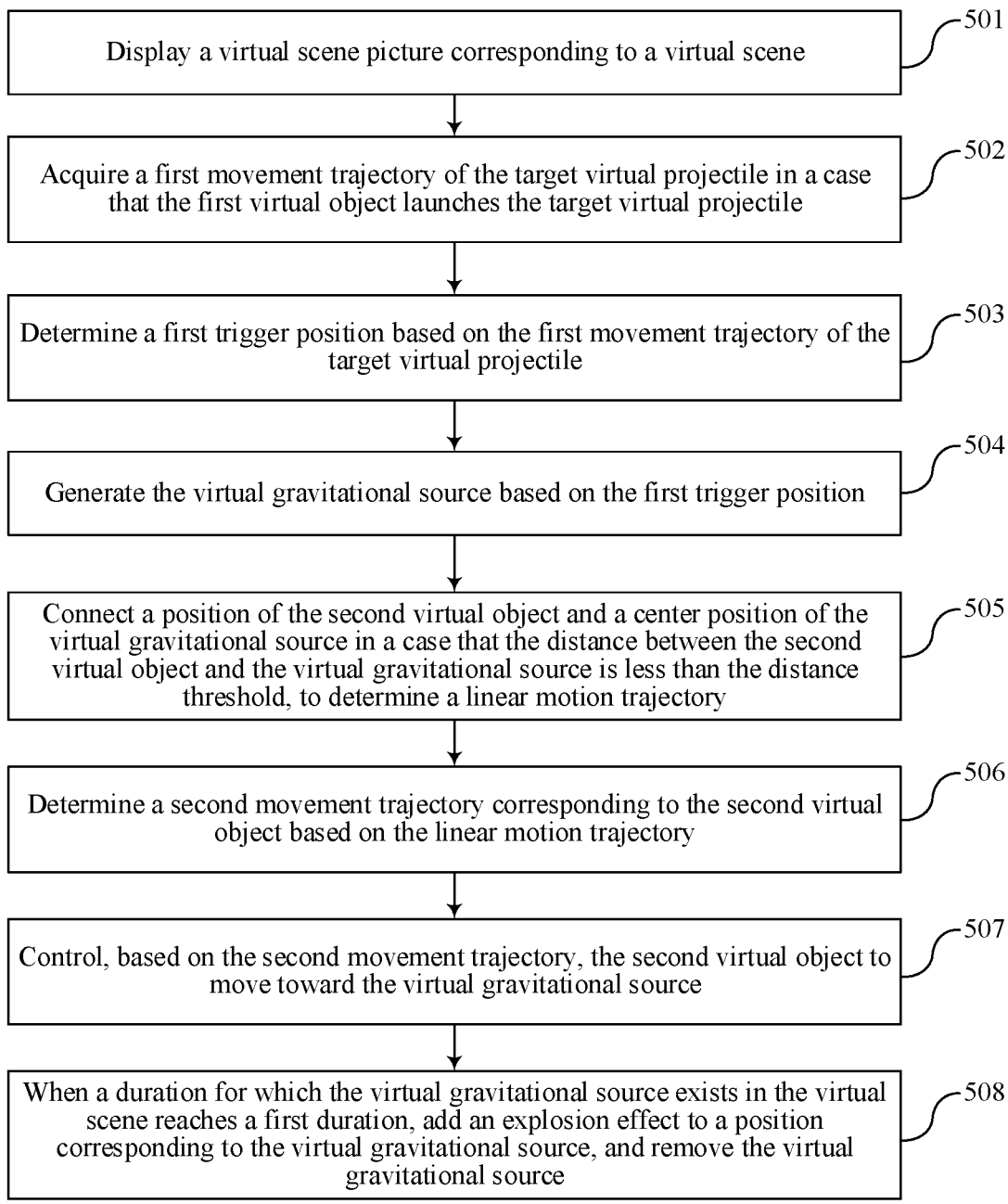
FIG. 5 is a flowchart of a virtual object control method according to an exemplary embodiment of this application.

FIG. 5 is a flowchart of a virtual object control method according to an exemplary embodiment of this application. The method may be performed by a computer device, where the computer device may be a terminal or a server, or the computer device may alternatively include the terminal and the server. As shown in FIG. 5, an example in which the computer device is a terminal is used. The terminal may control virtual objects to move by performing the following steps:

Step 501: Display a virtual scene picture corresponding to a virtual scene.

In this embodiment of this application, the computer device displays a virtual scene picture corresponding to a virtual scene.

The virtual scene includes a first virtual object, and the first virtual object carries a target virtual projectile; or the first virtual object carries a virtual prop for launching the target virtual projectile.

Step 502: Acquire a first movement trajectory of the target virtual projectile when the first virtual object launches the target virtual projectile.

In this embodiment of this application, when the first virtual object launches the target virtual projectile, the computer device acquires the first movement trajectory of the target virtual projectile according to a program algorithm.

In a possible implementation, the first virtual object is equipped with a target virtual prop; and when receiving a launch operation of a user, the computer device controls the first virtual object to use the target virtual prop to launch the target virtual projectile, and acquires a first movement trajectory of the target virtual projectile.

The target virtual prop is a virtual prop configured to launch the target virtual projectile. For example, when the target virtual projectile is a virtual projectile, when receiving a launch operation of the user, the computer device controls the first virtual object to use the target virtual prop to launch the target virtual projectile, and acquires a first movement trajectory corresponding to the target virtual projectile.

In another possible implementation, the first virtual object directly carries a target virtual projectile, and the target virtual projectile is a virtual prop that supports being directly launched or thrown by the first virtual object; and when receiving a launch operation of the user, the computer device controls the first virtual object to directly launch or throw the target virtual projectile, and acquires a first movement trajectory of the target virtual projectile.

For example, when the target virtual projectile is a virtual explosive, when receiving a launch operation of the user, the computer device controls the first virtual object to throw the virtual explosive, and acquires a first movement trajectory of the virtual explosive.

In a possible implementation, in a process in which the first virtual object prepares to launch the target virtual projectile, a sight bead icon is displayed in the virtual scene picture. The sight bead icon is used for indicating an aiming position.

A state in which the first virtual object launches the target virtual projectile may include a hip launch state and an aiming state. The hip launch state refers to a state in which the first virtual object launches the target virtual projectile without using a scope for aiming; and the aiming state refers to a state in which the first virtual object performs aiming by using a scope and then launches the target virtual projectile.

In some embodiments, when the first virtual object is in a hip launch state, in a non-firing state, when there is a second virtual object in a different camp from the first virtual object at the aiming position, a color of the sight bead icon may change. For example, in a non-firing state, when there is no second virtual object in a different camp from the first virtual object at the aiming position, the color of the sight bead icon is white. For example, when there is no virtual object at the aiming position, or when a virtual object at the aiming position is in the same camp as the first virtual object, the color of the sight bead icon is white; or when there is a second virtual object in a different camp from the first virtual object at the aiming position, the color of the sight bead icon may change from white to red, which is used for reminding the first virtual object that a second virtual object in a different camp from the first virtual object has been aimed at.

In some embodiments, when the first virtual object is in a hip launch state, the color of the sight bead icon in a firing state is different from the color of the sight bead icon in a non-firing state; for example, in a firing state, the sight bead icon may be set to yellow.

In some embodiments, when the first virtual object is in a hip launch state, the sight bead icon may include an inner ring and an outer ring; in a non-firing state, rotational speeds of the inner ring and the outer ring are different; and in a firing state, the inner ring and the outer ring may be dispersed into three arcs, and present the shape of first spreading and then shrinking.

In some embodiments, when the first virtual object is in an aiming state, in a non-firing state, the sight bead icon may include an inner ring and an outer ring, and rotational speeds of the inner ring and the outer ring are the same; and in a firing state, the inner ring and the outer ring may be dispersed into three arcs, and also present the shape of first spreading and then shrinking.

In this embodiment of this application, the first movement trajectory is used for indicating an estimated movement trajectory of the target virtual projectile during movement after being launched.

The first movement trajectory may be an estimated movement trajectory calculated by the computer device through a program according to an initial launch speed, a launch direction, and a launch position at the launch moment of the target virtual projectile; and the first movement trajectory is used for indicating a movement trajectory between the launch position and an estimated maximum range position. In some embodiments, the computer device calculates the estimated movement trajectory based on a parabola principle. Alternatively, the first movement trajectory may alternatively be a movement trajectory of the target virtual projectile generated by the computer device based on an actual movement position of the target virtual projectile at each time point during movement of the target virtual projectile after being launched, where the actual movement position at each time point is calculated by the computer device in real time.

In a possible implementation, the user may control, through a power accumulating operation, the initial launch speed at which the first virtual object launches the target virtual projectile. In other words, the computer device changes, based on the received power accumulating operation of the user, the initial launch speed at which the first virtual object launches the target virtual projectile.

The power accumulating operation may be controlled by prolonging a trigger time for a specified control. In some embodiments, if the received trigger time for the specified control is longer than a first trigger time, the initial launch speed of the target virtual projectile is modified based on a length of the trigger time.

In addition, the initial launch speed of the target virtual projectile is positively correlated with the trigger time of the power accumulating operation. In other words, on the premise that the received trigger time for the specified control is longer than the first trigger time, a longer trigger time of the power accumulating operation indicates a higher initial launch speed of the target virtual projectile; and a shorter trigger time of the power accumulating operation indicates a lower initial launch speed of the target virtual projectile.

Moreover, the initial launch speed is positively correlated with a maximum range of the target virtual projectile when there is no collider in the first movement trajectory. In other words, a higher initial launch speed indicates a farther maximum range of the target virtual projectile when there is no collider in the first movement trajectory; and a lower initial launch speed indicates a closer maximum range of the target virtual projectile when there is no collider in the first movement trajectory. That there is no collider in the first movement trajectory means that the first movement trajectory passes through no obstacle in the virtual scene.

In some embodiments, the initial launch speed is negatively correlated with a parabola radian of the first movement trajectory; that is, a higher initial launch speed indicates a smaller parabola radian, and a lower initial launch speed indicates a larger parabola radian.

Step 503: Determine a first trigger position based on the first movement trajectory of the target virtual projectile.

In this embodiment of this application, the computer device determines the first trigger position based on the acquired first movement trajectory corresponding to the target virtual projectile.

The first trigger position is a maximum range position when no collision occurs during movement of the target virtual projectile along the first movement trajectory, or a position at which the target virtual projectile collides with an obstacle.

In a possible implementation, when the first movement trajectory is an estimated movement trajectory generated by the computer device through program calculation at a launch moment of the target virtual projectile, whether there is a case in which the first movement trajectory passes through an obstacle is determined, that is, whether there is a case in which the target virtual projectile collides with an obstacle in the virtual scene during movement along the first movement trajectory is determined. If it is determined that there is a case of collision with an obstacle, a collision position is acquired as the first trigger position, the collision position being a position at which the target virtual projectile collides with the obstacle; and if it is determined that there is no case of collision with an obstacle, the maximum range position of the first movement trajectory is acquired as the first trigger position.

In another possible implementation, when the first movement trajectory is a movement trajectory of the target virtual projectile generated by the computer device based on an actual movement position of the target virtual projectile at each time point during movement of the target virtual projectile after being launched, where the actual movement position at each time point is calculated by the computer device in real time, the computer device determines in real time whether there is case in which the target virtual projectile collides with an obstacle. If it is determined that there is a case of collision with an obstacle, a position at which the collision occurs is determined as the first trigger position, and the movement of the target virtual projectile is stopped; and if it is determined that there is no case of collision with an obstacle, the maximum range position reached by the target virtual projectile is determined as the first trigger position.

The obstacle includes, but not limited to, a virtual thing, a virtual vehicle, or a virtual object with a collision box in the virtual scene.

In a possible implementation, when the target virtual projectile collides with the second virtual object, and the second virtual object and the first virtual object are in different camps, a first attribute value of the second virtual object is modified.

The first attribute value may be used for indicating current hit points of the virtual object; and the target virtual projectile can reduce the current hit points of the virtual object that collides with the target virtual projectile by a specified value.

Step 504: Generate the virtual gravitational source at the first trigger position.

In this embodiment of this application, the computer device generates the virtual gravitational source based on the determined first trigger position.

The virtual gravitational source may have a gravitational force of a specified value, for producing an attraction effect on virtual objects or virtual things within a distance threshold range.

In other words, a virtual object or a virtual thing within the distance threshold range of the virtual gravitational source may be attracted by the virtual gravitational source, and move toward the virtual gravitational source under the gravitational force.

In a possible implementation, the virtual gravitational source has a certain volume in the virtual scene, that is, the virtual gravitational source has a collision box in the virtual scene; and to avoid a case that the virtual gravitational source cannot be completely displayed in the virtual scene or a case that model cross and threading up occur during display of the virtual gravitational source caused by the lack of space at the first trigger position, a volume of the virtual gravitational source needs to be compared with a volume of space around the first trigger position that supports display.

In some embodiments, the volume of the target virtual projectile is smaller than the volume of the virtual gravitational source. Because the volume of the target virtual projectile is smaller than the volume of the virtual gravitational source, during the movement along the first movement trajectory, the target virtual projectile may enter certain space and be completely displayed in the virtual scene, but a volume of the space is smaller than the volume of the virtual gravitational source. When the first trigger position is in the space, the virtual gravitational source cannot be completely displayed in the space, resulting in a case of incomplete display of the virtual gravitational source or threading up of the virtual gravitational source. Therefore, to avoid a case of incomplete display of the virtual gravitational source or threading up of the virtual gravitational source in the virtual scene, when the volume of the surrounding space of the first trigger position is greater than or equal to the volume of the virtual gravitational source, the virtual gravitational source is generated at the first trigger position. When the volume of the surrounding space of the first trigger position is less than the volume of the virtual gravitational source, a second trigger position is determined, and the virtual gravitational source is generated at the second trigger position.

The second trigger position is a position on the first movement trajectory and for which a volume of surrounding space is greater than or equal to the volume of the virtual gravitational source.

In a possible implementation, the second trigger position is on the first movement trajectory before the first trigger position is reached, or the second trigger position is on an extension line of the first movement trajectory after the first trigger position is reached.

In some embodiments, the second trigger position is a position on the first movement trajectory, closest to the first trigger position, and for which the volume of the surrounding space is greater than or equal to the volume of the virtual gravitational source. For example, when it is determined that a virtual gravitational source needs to be generated at the second trigger position, a closest position point on the first movement trajectory that supports complete display of virtual gravitational source around the first trigger position is acquired as the second trigger position, and the complete virtual gravitational source is displayed at the determined second trigger position.

The virtual gravitational source may be any model with an actual volume. For example, the virtual gravitational source may be a model with a regular shape such as a sphere model or a cube model, or the virtual gravitational source may be model with an irregular shape.

Figure 6:
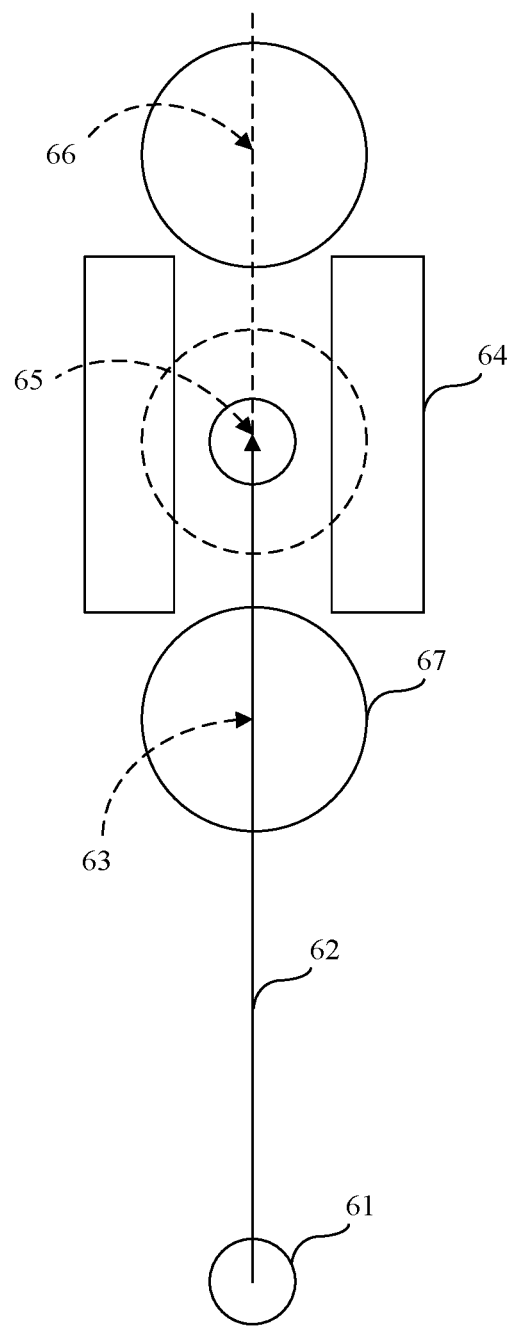
FIG. 6 is a schematic diagram of a process of determining a second trigger position involved in the embodiment shown in FIG. 5.

An example in which the virtual gravitational source is a virtual sphere, and the volume of the target virtual projectile is smaller than the volume of the virtual gravitational source is used. FIG. 6 is a schematic diagram of a process of determining a second trigger position involved in an embodiment of this application. As shown in FIG. 6, after being launched, a target virtual projectile 61 moves in the virtual scene along a first movement trajectory 62. It is assumed that the target virtual projectile 61 has no collision during the movement, a maximum range position 65 may be determined as the first trigger position. The computer device acquires the volume of the surrounding space of the first trigger position, and confirms whether the surrounding space of the first trigger position can accommodate the complete display of the virtual gravitational source. As shown in FIG. 6, an obstacle 64 that does not support the complete display of the virtual gravitational source 67 exists in the surrounding space of the first trigger position. Therefore, the computer device confirms that the surrounding space of the first trigger position cannot accommodate the virtual gravitational source. In this case, the first movement trajectory 62 and a position point on the extension line of the first movement trajectory, closest to the first trigger position, and supporting the complete display of the virtual gravitational source 67 are acquired, and a first position point 63 on the first movement trajectory 62 is used as a second trigger position, or a second position point 66 on the extension line of the first movement trajectory 62 is used as the second trigger position. When the target virtual projectile 61 runs to a maximum range position 65, a virtual gravitational source 67 is generated at the first position point 63 or the second position point 66.

In some embodiments, the computer device may determine the second trigger position from the first position point 63 and the second position point 66 based on a magnitude relationship between a first distance between the first position point 63 and the first trigger position 65 and a second distance between the second position point 66 and the first trigger position point 65. In some embodiments, a distance between the position point corresponding to the second trigger position and the first trigger position is the shortest.

For example, after the target virtual projectile is launched, ray detection is performed in the movement direction of the target virtual projectile, to detect whether there is enough space on the forward movement trajectory for generating a virtual gravitational source; and if it is detected that the space volume at a certain position cannot meet the needs of generating a virtual gravitational source, and a distance between the position and the first trigger position is less than a first threshold, the target virtual projectile may be made to disappear before the target virtual projectile reaches the space, and the virtual gravitational source may be generated in advance. In this way, the phenomenon of threading up caused by generation of the virtual gravitational source in a small space can be avoided. For example, when the virtual gravitational source is a virtual sphere, the first threshold may be greater than or equal to a value of a radius of the virtual gravitational source. The value of the first threshold may be set by relevant personnel, which is not limited in this application.

In some embodiments, after the first trigger position or the second trigger position is determined, that is, after a generation position of the virtual gravitational source is determined, a virtual gravitational source may be generated by using the generation position of the virtual gravitational source as a center in a form of spreading from the inside to the outside; alternatively, a center of a collision box corresponding to the virtual gravitational source may also be overlapped with the generation position to determine a display position of the virtual gravitational source in the virtual scene, and the virtual gravitational source is displayed at the position.

Step 505: Connect a position of the second virtual object and a center position of the virtual gravitational source when the distance between the second virtual object and the virtual gravitational source is less than the distance threshold, to determine a linear motion trajectory.

In some embodiments, the distance between the second virtual object and the virtual gravitational source in this embodiment of this application refers to the distance between the position of the second virtual object and the center position of the virtual gravitational source.

In this embodiment of this application, the computer device may respectively acquire the position of the second virtual object and the center position of the virtual gravitational source, to determine whether a distance between the second virtual object and the virtual gravitational source is less than a distance threshold. After detecting that the distance between the position of the second virtual object and the center position of the virtual gravitational source is less than the distance threshold, a linear motion trajectory corresponding to the second virtual object is determined based on a connection line between the position of the second virtual object and the center position of the virtual gravitational source. The linear motion trajectory is used for indicating a reference trajectory for the second virtual object to move in the virtual scene based on the gravitational force of the virtual gravitational source.

The second virtual object may be a virtual object that has been eliminated, that is, hit points of the virtual object may be 0, and the virtual object cannot continue to move in the virtual scene based on a control operation of the user, but a model of the virtual object still exists in the virtual scene.

Figure 7:
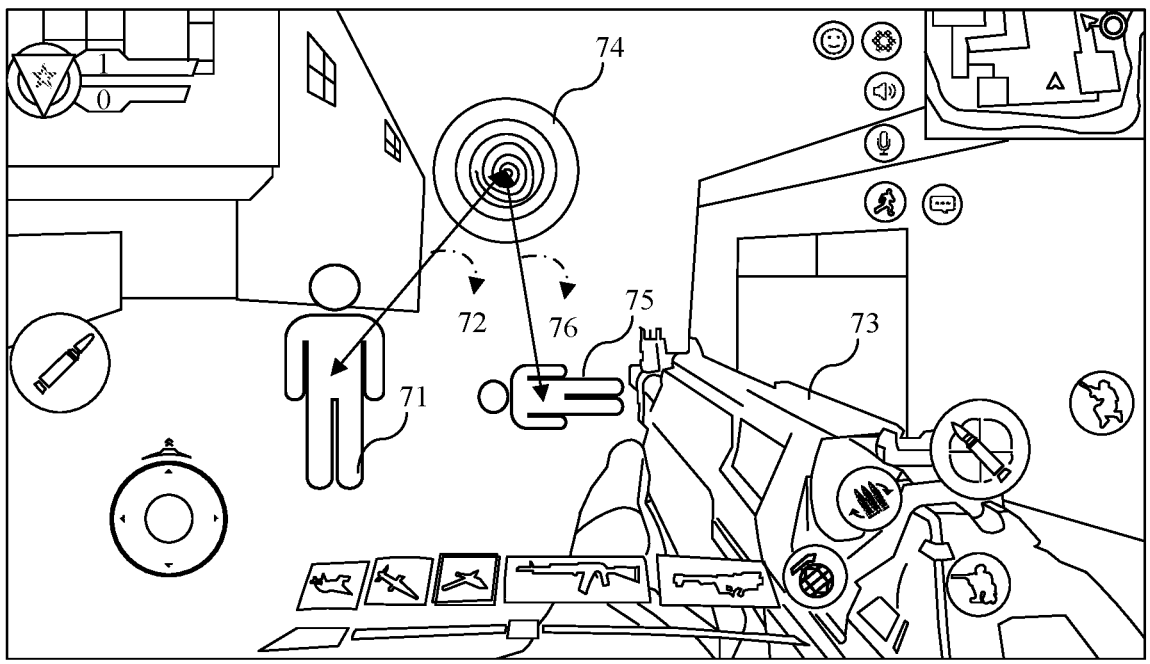
FIG. 7 is a schematic diagram of determining a linear motion trajectory corresponding to a second virtual object involved in the embodiment shown in FIG. 5.

For example, FIG. 7 is a schematic diagram of determining a linear motion trajectory corresponding to a second virtual object involved in an embodiment of this application. As shown in FIG. 7, the virtual scene includes a first virtual object 73, a second virtual object 71 that has not been eliminated, a second virtual object 75 that has been eliminated, and a virtual gravitational source 74. Distances between the second virtual object 71 that has not been eliminated and the second virtual object 75 that has been eliminated and the virtual gravitational source 74 are both less than the distance threshold, then a position of the second virtual object 71 that has not been eliminated and a center position of the virtual gravitational source 74 are connected, and the connection line between the two is determined as a linear motion trajectory 72 corresponding to the second virtual object 71 that has not been eliminated; and a position of the second virtual object 75 that has been eliminated and the center position of the virtual gravitational source 74 are connected, and a connection line between the two is determined as a linear motion trajectory 76 corresponding to the second virtual object 75 that has been eliminated.

In some embodiments, the position of the second virtual object may refer to a position of the head of the virtual object, a position of the center of gravity of the virtual object, a position of the feet of the virtual object, or the like. The manner of determining the position of the second virtual object may be set by relevant personnel, which is not limited in this application.

Step 506: Determine a second movement trajectory corresponding to the second virtual object based on the linear motion trajectory.

In this embodiment of this application, the computer device determines a second movement trajectory corresponding to each second virtual object based on an acquired linear motion trajectory corresponding to each second virtual object.

The second movement trajectory is used for indicating a movement trajectory along which the second virtual object moves toward the virtual gravitational source under the gravitational force of the virtual gravitational source.

In a possible implementation, before the second virtual object moves toward the virtual gravitational source, the computer device pre-calculates the second movement trajectory based on a program, or the computer device calculates a movement position of the second virtual object at the next moment in real time during movement of the second virtual object toward the virtual gravitational source, to generate a second movement trajectory.

In a possible implementation, when there is an obstacle that hinders the second virtual object on the linear motion trajectory, a second movement trajectory corresponding to the second virtual object is determined based on the linear motion trajectory and a position of the obstacle.

When determining whether there is an obstacle that can hinder the second virtual object on the linear motion trajectory, the computer device may acquire a highest position point and a lowest position point of the second virtual object in a vertical direction; respectively draw a parallel line of the linear motion trajectory based on the highest position point and the lowest position point, to obtain a motion region of the second virtual object during movement along the linear motion trajectory; and determine the second movement trajectory corresponding to the second virtual object based on an existence situation of an obstacle in the motion region.

1) When no obstacle exists in the motion region, the linear motion trajectory is determined as the second movement trajectory corresponding to the second virtual object.
2) When the obstacle exists in the motion region, the linear motion trajectory between the position of the second virtual object and the obstacle is determined as a first trajectory segment; a correction trajectory at which the obstacle is bypassed based on a gravitational direction of the virtual gravitational source is acquired; an end position of the correction trajectory and the center position of the virtual gravitational source is connected, to generate a second trajectory segment; and the second movement trajectory corresponding to the second virtual object is determined based on the first trajectory segment, the correction trajectory, and the second trajectory segment.

Figure 8:
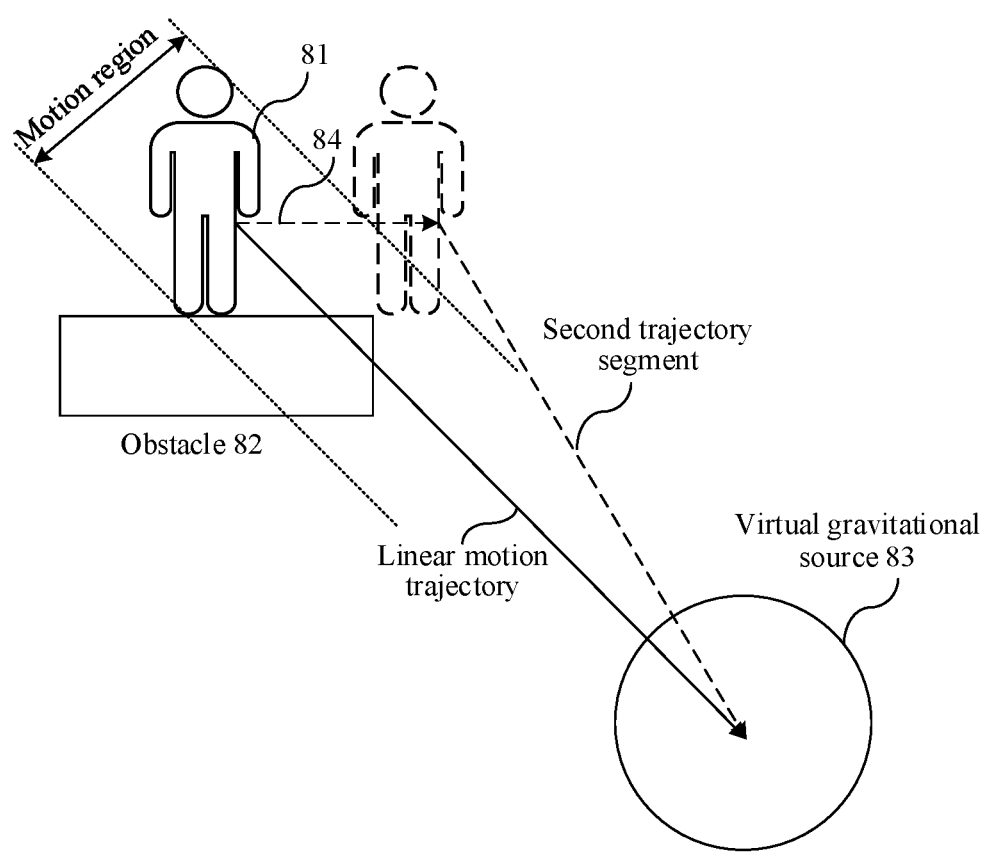
FIG. 8 is a schematic diagram of a process of determining a second movement trajectory involved in the embodiment shown in FIG. 5.

For example, FIG. 8 is a schematic diagram of a process of determining a second movement trajectory involved in an embodiment of this application. As shown in FIG. 8, a second virtual object 81 is close to an obstacle 82. Because a linear motion trajectory corresponding to the second virtual object 81 passes through the obstacle 82, the computer device determines a correction trajectory 84 in a horizontal direction based on that the obstacle 82 is bypassed based on a gravitational direction of the virtual gravitational source to the second virtual object 81, and then uses a connection line between an end position of the correction trajectory and a center position of the virtual gravitational source 83 as a second trajectory segment; and acquires a trajectory formed by the correction trajectory 84 and the second trajectory segment as the second movement trajectory.

Figure 9:
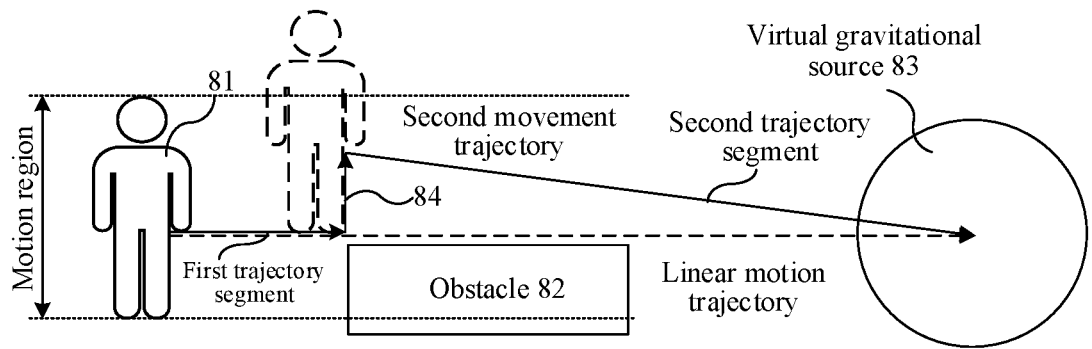
FIG. 9 is another schematic diagram of a process of determining a second movement trajectory involved in the embodiment shown in FIG. 5.

FIG. 9 is another schematic diagram of a process of determining a second movement trajectory involved in an embodiment of this application. As shown in FIG. 9, the second virtual object 81 is not close to the obstacle 82, and there is an obstacle in a motion region in which the second virtual object moves along the linear motion trajectory. Therefore, when the second virtual object 81 does not collide with the obstacle 82, a linear motion trajectory between the position of the second virtual object 81 and the obstacle is used as a first trajectory segment; and when the second virtual object 81 collides with the obstacle 82, the second virtual object 81 moves toward a closest position away from the obstacle, and the correction trajectory 84 is determined based on that the obstacle 82 is bypassed; and then a connection line between the end position of the correction trajectory and the center position of the virtual gravitational source 83 is used as a second trajectory segment. A trajectory formed by the first trajectory segment, the correction trajectory 84, and the second trajectory segment is acquired as the second movement trajectory.

In a possible implementation, when the second virtual object is blocked by an obstacle that cannot be bypassed based on the gravitational direction, the second movement trajectory of the second virtual object ends at a position at which the second virtual object collides with the obstacle.

For example, when there is a low obstacle on the linear motion trajectory, by automatically correcting the motion trajectory, a second movement trajectory at which the obstacle is bypassed and then movement is performed toward the virtual gravitational source is generated. If there is a tall obstacle on the linear motion trajectory, and the gravitational force of the virtual gravitational source cannot control the second virtual object to bypass the obstacle, the second virtual object cannot continue to move toward the virtual gravitational source, but can continue to receive the gravitational force of the virtual gravitational source. The computer device may control the second virtual object to stick to the obstacle, and in this case, the user cannot control the second virtual object to move in the virtual scene. In some embodiments, the computer device determines, based on a movement attribute of the second virtual object and a height of the obstacle, whether the second virtual object can bypass the obstacle. For example, when a jumping height of the second virtual object is greater than the height of the obstacle, it is determined that the second virtual object can bypass the obstacle; and when the jumping height of the second virtual object is less than the height of the obstacle, it is determined that the second virtual object cannot bypass the obstacle.

Step 507: Control, based on the second movement trajectory, the second virtual object to move toward the virtual gravitational source.

In this embodiment of this application, the computer device acquires the second movement trajectory corresponding to the second virtual object, and controls the second virtual object to move toward the virtual gravitational source along the second movement trajectory.

In a possible implementation, an initial speed at which the second virtual object moves is correlated with the position of the second virtual object and the center position of the virtual gravitational source. The foregoing process of controlling the second virtual object to move toward the virtual gravitational source may be implemented as:

acquiring a first distance between a position of the second virtual object and a center position of the virtual gravitational source; determining, based on the first distance, an initial speed at which the second virtual object moves; and controlling the second virtual object to move toward the center position of the virtual gravitational source at the initial speed and a first acceleration.

The initial speed is negatively correlated with the first distance. That is, a longer first distance between the second virtual object and the virtual gravitational source indicates a lower initial speed of the second virtual object during movement to the virtual gravitational source under a gravitational force of the virtual gravitational source; on the contrary, a shorter first distance between the second virtual object and the virtual gravitational source indicates a higher initial speed of the second virtual object during movement to the virtual gravitational source under the gravitational force of the virtual gravitational source.

In some embodiments, a value of the first acceleration may be a first target value, which does not change with the distance between the second virtual object and the virtual gravitational source. The first target value may be set by relevant personnel.

In another possible implementation, during movement of the second virtual object to the virtual gravitational source, as the first distance decreases, the gravitational force received by the second virtual object is stronger, and the first acceleration gradually increases. In this case, the computer device determines, based on the first distance, the first acceleration at which the second virtual object moves; and controls, based on the first acceleration, the second virtual object to move toward the center position of the virtual gravitational source.

The first acceleration is in negatively correlated with the first distance. That is, a longer first distance between the position of the second virtual object and the center position of the virtual gravitational source indicates a smaller gravitational force of the virtual gravitational source received by the second virtual object and a lower first acceleration of the second virtual object during movement to the virtual gravitational source; on the contrary, a shorter first distance between the second virtual object and the virtual gravitational source indicates a larger gravitational force of the virtual gravitational source received by the second virtual object and a higher first acceleration of the second virtual object during movement to the virtual gravitational source. During movement of the second virtual object to the virtual gravitational source, as the distance between the position of the second virtual object and the center position of the virtual gravitational source gradually decreases, the gravitational force of the virtual gravitational source received by the second virtual object gradually increases, and the first acceleration gradually increases.

In some embodiments, a minimum value of the first acceleration is greater than an acceleration at which the second virtual object is controlled to move by receiving a trigger operation on a directional control, or the initial speed of the second virtual object is greater than a speed at which the second virtual object has been controlled to move by receiving a trigger operation on the directional control, to ensure that the computer device cannot control, based on the received trigger operation on the directional control, the second virtual object to move away from the virtual gravitational source.

In a possible implementation, the initial speed of the second virtual object may be 0, or the initial speed of the second virtual object may be a second target value; and the computer device controls, based on the initial speed and the first acceleration, the second virtual object to move toward the center position of the virtual gravitational source. In some embodiments, the second target value may be greater than a highest movement speed of the second virtual object controlled by receiving the trigger operation on the directional control, to ensure that the computer device cannot control, based on the received trigger operation on the directional control, the second virtual object to move away from the virtual gravitational source.

Step 508: When a duration for which the virtual gravitational source exists in the virtual scene reaches a first duration, add an explosion effect to a position corresponding to the virtual gravitational source, and remove the virtual gravitational source.

In this embodiment of this application, the computer device acquires the duration for which the virtual gravitational source exists in the virtual scene, and when the existence duration reaches the first duration, adds an explosion effect to the position corresponding to the virtual gravitational source in the virtual scene, and removes a model of the virtual gravitational source to meet the law of gravitational collapse. In some embodiments, the foregoing process may be implemented as: removing the model of the virtual gravitational source, and adding a virtual prop with an explosion effect at the corresponding position of the virtual gravitational source, where the virtual prop immediately produces an explosion effect. In some embodiments, in the foregoing process, only an explosion effect is added to the virtual scene, and a model of the virtual prop that causes the explosion effect, such as a virtual explosive, is not displayed in the virtual scene, so as to reflect the law of gravitational collapse.

To simulate the effect of damage caused to surrounding virtual objects when the virtual gravitational source explodes, when the existence duration of the virtual gravitational source reaches the first duration, the computer device may cause a certain decrease in the first attribute value of the second virtual object when adding an explosion effect to the corresponding position of the virtual gravitational source. A decreased value of the first attribute value is correlated with the distance between the position of the second virtual object and the center position of the virtual gravitational source, and the process may be implemented as:

acquiring a second distance between a position of the second virtual object and a center position of the virtual gravitational source when the duration for which the virtual gravitational source exists in the virtual scene reaches the first duration; and modifying a first attribute value of the second virtual object based on the second distance, the second distance being negatively correlated with a modified value of the first attribute value.

In some embodiments, the modification to the first attribute value of the second virtual object may be represented as decreasing the value of the first attribute value, or increasing the value of the first attribute value. An example in which the modified value of the first attribute value is a decreased value is used. The decreased value is negatively correlated with the second distance. In other words, when an explosion effect is added to the virtual scene, a longer second distance indicates smaller damage caused to the second virtual object and a smaller decreased value; and a shorter second distance indicates greater damage caused to the second virtual object and a greater decreased value. The relationship between the second distance and the decreased value may be set by relevant personnel, which is not limited in this application. The first attribute value may be hit points, a defense power value, or the like.

In a possible implementation, in the duration for which the virtual gravitational source exists, in addition to that a gravitational force may be applied to the second virtual object, changing a movement direction and a movement speed of the second virtual object may further affect the first attribute value of the second virtual object. An impact value for the first attribute value is negatively correlated with the first distance. In other words, when the duration for which the virtual gravitational source exists does not reach the first duration, the virtual gravitational source may cause damage to a second virtual object within the distance threshold range. A shorter first distance indicates a larger impact value, and a longer first distance indicates a smaller impact value.

In a possible implementation, the explosion effect corresponding to the virtual gravitational source may affect the first attribute value of a virtual object in a different camp from the first virtual object in the duration for which the virtual gravitational source exists. Therefore, the computer device may determine whether the second virtual object is a virtual object in the same camp as the first virtual object. If the second virtual object is in the same camp as the first virtual object, the first attribute value of the second virtual object may not be modified; and if the second virtual object and the first virtual object are in different camps, the first attribute value of the second virtual object may be modified.

In other words, a virtual object in the same camp as the first virtual object will change its movement speed and movement direction under the action of the virtual gravitational source, which affects the first attribute value. Therefore, by using a mechanism in which a virtual object in the same camp as the first virtual object is controlled to move based on the virtual gravitational source, movement control on the virtual object can be realized, thereby saving the terminal control resources for mastering the second virtual object. In addition, by using a mechanism in which the first attribute value of a second virtual object in a different camp from the first virtual object is modified based on the virtual gravitational source, a battle advantage is quickly created for the camp of the first virtual object, to speed up the battle, thereby saving the terminal processing resources for mastering the first virtual object.

In some embodiments, when the second virtual object moves to the center position of the virtual gravitational source, the first attribute value of the second virtual object is modified to 0.

For example, if the second virtual object moves to the center position of the virtual gravitational source within the duration for which the virtual gravitational source exists, the hit points of the second virtual object are reset to 0, and the second virtual object is eliminated.

In a possible implementation, when the duration for which the virtual gravitational source exists in the virtual scene reaches the first duration, the second virtual object is controlled to move toward an opposite direction of a gravitational force provided by the virtual gravitational source.

In other words, when the explosion effect is generated based on the virtual gravitational source, in addition to the numerical modification on the first attribute value of each second virtual object, each second virtual object is further caused to move in an opposite direction according to a counterforce of the gravitational force previously received by each second virtual object. This process can simulate the force receiving situation of virtual objects during the explosion, and conforms to the principle of physical motion. The process of simulating the explosion may be that an explosion algorithm of a virtual explosive is set in the program, and no relevant model is set, so that an explosion effect can be realized in the virtual scene. Second virtual objects receiving the counterforce to move in the opposite direction includes a second virtual object that has not been eliminated and a second virtual object that has been eliminated.

The second virtual object that has been eliminated may be moved and scattered based on the rag doll physical effect.

In a possible implementation, when the distance between the position of the second virtual object and the center position of the virtual gravitational source is less than the distance threshold, a first direction that a center position of the virtual gravitational source faces relative to the second virtual object is acquired; a first action of the second virtual object during movement toward the center position of the virtual gravitational source is determined based on the first direction; and the second virtual object is controlled, based on the first action, to move toward the center position of the virtual gravitational source.

Figure 10:
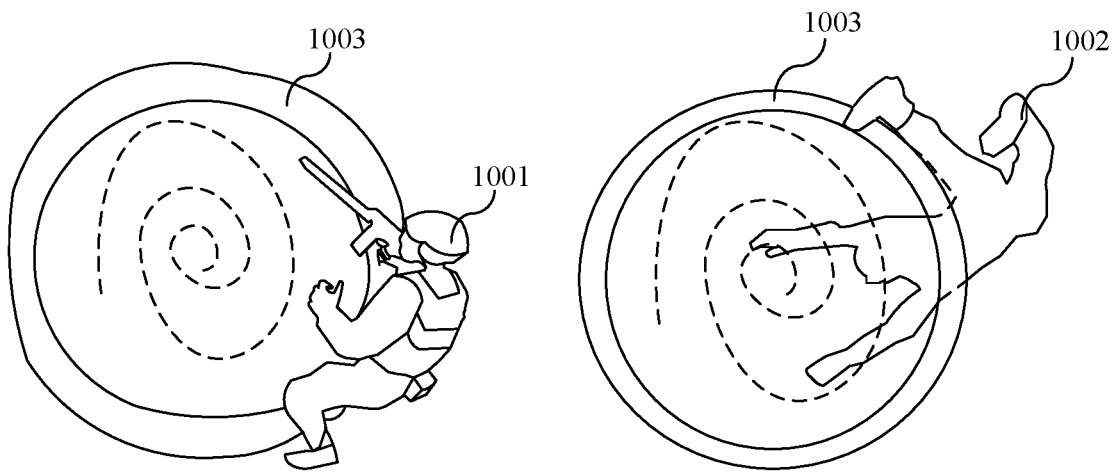
FIG. 10 is a schematic diagram of actions of second virtual objects during movement toward a virtual gravitational source involved in the embodiment shown in FIG. 5.

Orientations of second virtual objects relative to the center position of the virtual gravitational source are different, and during movement based on the gravitational force, movement actions of the second virtual objects are different. For example, FIG. 10 is a schematic diagram of actions of second virtual objects during movement toward a virtual gravitational source involved in an embodiment of this application. As shown in FIG. 10, if a second virtual object 1001 under the gravitational force faces the virtual gravitational source 1003 in a horizontal direction, the second virtual object 1001 moves with a corresponding first action during movement toward a virtual gravitational source 1003. If a second virtual object 1002 under the gravitational force faces the virtual gravitational source 1003 in a vertical direction, the second virtual object 1002 moves with the corresponding first action shown in FIG. 10 during movement toward the virtual gravitational source 1003.

In addition, because the orientation of the second virtual object may change during movement, the computer device may detect a current orientation in real time, and display a first action corresponding to the orientation in the virtual scene.

Based on the above, in the solution shown in this embodiment of this application, a first virtual object is controlled to launch a target virtual projectile, and a virtual gravitational source is generated based on a position of the target virtual projectile, so that when a second virtual object is within a function range of the virtual gravitational source, the second virtual object is controlled to move toward the virtual gravitational source. By using the foregoing method, a solution for quickly gathering second virtual objects to a specified position is provided. By controlling the first virtual object to launch the target virtual projectile, second virtual objects within a specified range are controlled to move toward the same position, so as to realize simultaneous control interaction between the first virtual object and a plurality of second virtual objects, and shorten a duration of a single-round battle through a centralized operation on the second virtual objects subsequently, thereby reducing the power consumption of a terminal and saving data traffic.

In some embodiments, after the second virtual objects within the specified range are gathered to the same position through the virtual gravitational source, a centralized operation on the plurality of second virtual objects can be realized, thereby reducing the steps and operation procedures of operating the plurality of virtual objects one by one, which further shortens a duration of a single-round battle, thereby reducing the power consumption of a terminal and saving data traffic.

Figure 11:
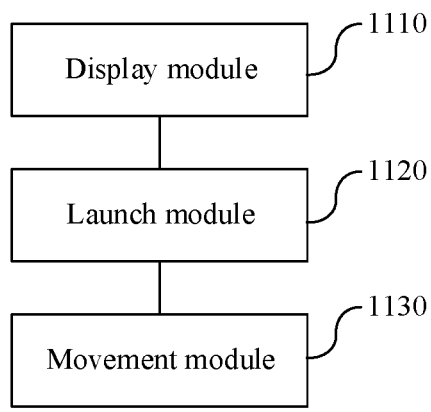
FIG. 11 is a structural block diagram of a virtual object control apparatus according to an exemplary embodiment of this application.

FIG. 11 is a structural block diagram of a virtual object control apparatus according to an exemplary embodiment of this application. The apparatus includes:

a display module 1110, configured to display a virtual scene picture corresponding to a virtual scene, the virtual scene including a first virtual object;

a launch module 1120, configured to control the first virtual object to launch a target virtual projectile, the target virtual projectile being configured to trigger a virtual gravitational source in the virtual scene; and a movement module 1130, configured to control, when a distance between a second virtual object and the virtual gravitational source is less than a distance threshold, the second virtual object to move toward the virtual gravitational source.

In a possible implementation, the apparatus further includes:

a generation module, configured to generate the virtual gravitational source based on a position of the target virtual projectile.

In a possible implementation, the generation module includes:

a first trajectory acquisition submodule, configured to acquire a first movement trajectory of the target virtual projectile when the first virtual object launches the target virtual projectile;

a first position determining submodule, configured to determine a first trigger position based on the first movement trajectory of the target virtual projectile, the first trigger position being a maximum range position when no collision occurs during movement of the target virtual projectile along the first movement trajectory, or a position at which the target virtual projectile collides with an obstacle; and a gravitational source generation submodule, configured to generate the virtual gravitational source at the first trigger position.

In a possible implementation, the gravitational source generation submodule includes:

a first generation unit, configured to generate the virtual gravitational source at the first trigger position when a volume of surrounding space of the first trigger position is greater than or equal to a volume of the virtual gravitational source.

In a possible implementation, the gravitational source generation submodule includes:

a second position determining unit, configured to determine a second trigger position when a volume of surrounding space of the first trigger position is less than a volume of the virtual gravitational source, the second trigger position being a position on the first movement trajectory and for which a volume of surrounding space is greater than or equal to the volume of the virtual gravitational source; and a second generation unit, configured to generate the virtual gravitational source at the second trigger position.

In a possible implementation, the movement module 1130 includes:

a straight line determining submodule, configured to connect a position of the second virtual object and a center position of the virtual gravitational source when the distance between the second virtual object and the virtual gravitational source is less than the distance threshold, to determine a linear motion trajectory;

a second trajectory determining submodule, configured to determine a second movement trajectory corresponding to the second virtual object based on the linear motion trajectory; and a movement control submodule, configured to control, based on the second movement trajectory, the second virtual object to move toward the virtual gravitational source.

In a possible implementation, the second trajectory determining submodule includes:

a position point acquisition unit, configured to acquire a highest position point and a lowest position point of the second virtual object in a vertical direction;

a region acquisition unit, configured to respectively draw a parallel line of the linear motion trajectory based on the highest position point and the lowest position point, to obtain a motion region of the second virtual object during movement along the linear motion trajectory; and a second trajectory determining unit, configured to determine the second movement trajectory corresponding to the second virtual object based on an existence situation of an obstacle in the motion region.

In a possible implementation, the second trajectory determining unit is configured to:

determine the linear motion trajectory as the second movement trajectory corresponding to the second virtual object when no obstacle exists in the motion region.

In a possible implementation, the second trajectory determining unit is configured to:

determine the linear motion trajectory between the position of the second virtual object and the obstacle as a first trajectory segment when the obstacle exists in the motion region;

acquire a correction trajectory at which the obstacle is bypassed based on a gravitational direction of the virtual gravitational source;

connect an end position of the correction trajectory and the center position of the virtual gravitational source, to generate a second trajectory segment; and determine the second movement trajectory corresponding to the second virtual object based on the first trajectory segment, the correction trajectory, and the second trajectory segment.

In a possible implementation, the movement module 1130 includes:

a first distance acquisition submodule, configured to acquire a first distance between a position of the second virtual object and a center position of the virtual gravitational source;

an initial speed determining submodule, configured to determine, based on the first distance, a first acceleration at which the second virtual object moves, the first acceleration being negatively correlated with the first distance; and a movement submodule, configured to control, based on the first acceleration, the second virtual object to move toward the center position of the virtual gravitational source.

In a possible implementation, the apparatus further includes:

an effect addition module, configured to: when a duration for which the virtual gravitational source exists in the virtual scene reaches a first duration, add an explosion effect to a position corresponding to the virtual gravitational source, and remove the virtual gravitational source.

In a possible implementation, the apparatus further includes:

a second distance acquisition module, configured to acquire a second distance between a position of the second virtual object and a center position of the virtual gravitational source when the duration for which the virtual gravitational source exists in the virtual scene reaches the first duration; and an attribute modification module, configured to modify a first attribute value of the second virtual object based on the second distance, the second distance being negatively correlated with a modified value of the first attribute value.

In a possible implementation, the apparatus further includes:

a reverse movement module, configured to control, when the duration for which the virtual gravitational source exists in the virtual scene reaches the first duration, the second virtual object to move toward an opposite direction of a gravitational force provided by the virtual gravitational source.

In a possible implementation, the apparatus further includes:

an attribute zeroing module, configured to modify the first attribute value of the second virtual object to 0 when the second virtual object moves to the center position of the virtual gravitational source.

Based on the above, the apparatus shown in this embodiment of this application controls a first virtual object to launch a target virtual projectile, and generates a virtual gravitational source based on a position of the target virtual projectile, so as to control, when a second virtual object is within a function range of the virtual gravitational source, the second virtual object to move toward the virtual gravitational source. By using the foregoing method, a solution for quickly gathering second virtual objects to a specified position is provided. By controlling the first virtual object to launch the target virtual projectile, second virtual objects within a specified range are controlled to move toward the same position, so as to realize control on a plurality of second virtual objects by the first virtual object, and shorten a duration of a single-round battle, thereby reducing the power consumption of a terminal and saving data traffic.

Figure 12:
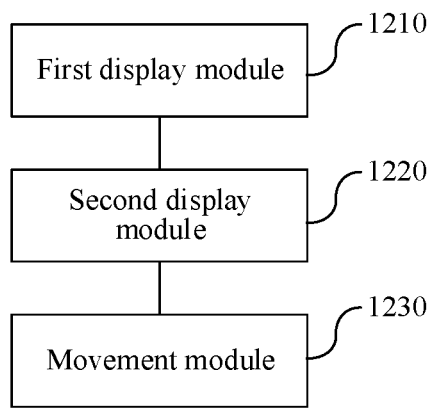
FIG. 12 is a structural block diagram of a virtual object control apparatus according to an exemplary embodiment of this application.

FIG. 12 is a structural block diagram of a virtual object control apparatus according to an exemplary embodiment of this application. The apparatus includes:

- a first display module 1210, configured to display a first virtual scene picture corresponding to a virtual scene, the first virtual scene picture including a first virtual object;
- a second display module 1220, configured to display a second virtual scene picture when the first virtual object launches a target virtual projectile, the second virtual scene picture including a virtual gravitational source, the virtual gravitational source being generated based on a position of the target virtual projectile; and
- a movement module 1230, configured to control, when a distance between a second virtual object and the virtual gravitational source is less than a distance threshold, the second virtual object to move toward the virtual gravitational source.

In a possible implementation, the movement module 1230 includes:

- a direction confirmation submodule, configured to acquire, when the distance between the second virtual object and the virtual gravitational source is less than the distance threshold, a first direction that a center position of the virtual gravitational source faces relative to the second virtual object;
- an action acquisition submodule, configured to determine, based on the first direction, a first action of the second virtual object during movement toward the center position of the virtual gravitational source; and
- a movement submodule, configured to control, based on the first action, the second virtual object to move toward the center position of the virtual gravitational source.

Based on the above, the apparatus shown in this embodiment of this application controls a first virtual object to launch a target virtual projectile, and generates a virtual gravitational source based on a position of the target virtual projectile, so as to control, when a second virtual object is within a function range of the virtual gravitational source, the second virtual object to move toward the virtual gravitational source. By using the foregoing method, a solution for quickly gathering second virtual objects to a specified position is provided. By controlling the first virtual object to launch the target virtual projectile, second virtual objects within a specified range are controlled to move toward the same position, so as to realize control on a plurality of second virtual objects by the first virtual object; and after the second virtual objects within the specified range are gathered to the same position through the virtual gravitational source, a centralized operation on the plurality second virtual objects can be realized, to realize control on the plurality of second virtual objects by the first virtual object, and shorten a duration of a single-round battle, thereby reducing the power consumption of a terminal and saving data traffic.

Figure 13:
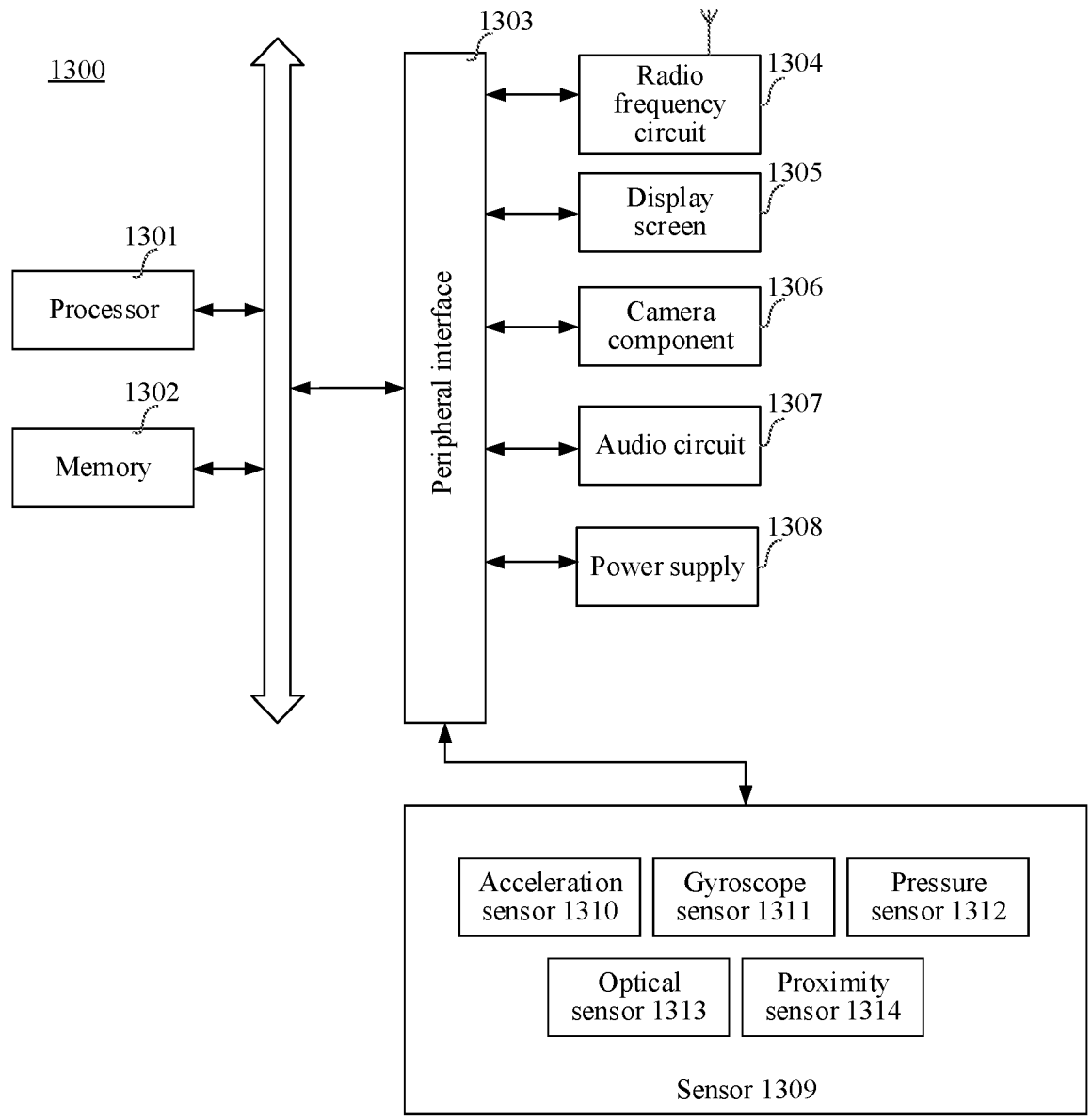
FIG. 13 is a structural block diagram of a computer device according to an exemplary embodiment of this application.

FIG. 13 is a structural block diagram of a computer device 1300 according to an exemplary embodiment. The computer device 1300 may be a user terminal such as a smartphone, a tablet computer, an MP3 player, an MP4 player, a notebook computer, or a desktop computer. The computer device 1300 may also be referred to as another name such as user equipment, a portable terminal, a laptop terminal, or a desktop terminal.

Generally, the computer device 1300 includes a processor 1301 and a memory 1302.

The processor 1301 may include one or more processing cores, for example, a 4-core processor or an 8-core processor. The processor 1301 may be implemented by using at least one hardware form of digital signal processing (DSP), a field-programmable gate array (FPGA), and a programmable logic array (PLA). The processor 1301 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 1301 may be integrated with a graphics processing unit (GPU). The GPU is configured to be responsible for rendering and drawing content that a display screen needs to display. In some embodiments, the processor 1301 may further include an artificial intelligence (AI) processor. The AI processor is configured to process a calculation operation related to machine learning.

The memory 1302 may include one or more computer-readable storage media. The computer-readable storage medium may be non-transient. The memory 1302 may further include a high-speed random access memory and a non-volatile memory, for example, one or more magnetic disk storage devices or flash memory devices. In some embodiments, the non-transitory computer-readable storage medium in the memory 1302 is configured to store at least one instruction, the at least one instruction being executed by the processor 1301 to implement all or some of the steps in the method provided in the method embodiments of this application.

In some embodiments, the computer device 1300 further includes a peripheral interface 1303 and at least one peripheral. The processor 1301, the memory 1302, and the peripheral interface 1303 may be connected by a bus or a signal cable. Each peripheral may be connected to the peripheral interface 1303 by a bus, a signal cable, or a circuit board. Specifically, the peripheral includes: at least one of a radio frequency (RF) circuit 1304, a display screen 1305, a camera component 1306, an audio circuit 1307, and a power supply 1308.

In some embodiments, the computer device 1300 further includes one or more sensors 1309. The one or more sensors 1309 include, but not limited to, an acceleration sensor 1310, a gyroscope sensor 1311, a pressure sensor 1312, an optical sensor 1313, and a proximity sensor 1314.

A person skilled in the art may understand that the structure shown in FIG. 13 does not constitute any limitation on the computer device 1300, and the computer device may include more or fewer components than those shown in the figure, or some components may be combined, or a different component deployment may be used.

In an exemplary embodiment, a non-temporary computer-readable storage medium including instructions is further provided, for example, a memory including at least one instruction, at least one program, a code set, or an instruction set. The at least one instruction, the at least one program, the code set, or the instruction set may be executed by a processor to implement all or some steps of the method shown in the embodiment corresponding to any one of FIG. 3, FIG. 4, or FIG. 5. For example, the non-temporary computer-readable storage medium may be a read-only memory (ROM), a random access memory (RAM), a compact disc read-only memory (CD-ROM), a magnetic tape, a floppy disk, an optical data storage device, or the like.

According to an aspect of this application, a computer program product or a computer program is provided, the computer program product or the computer program including computer instructions, the computer instructions being stored in a computer-readable storage medium. A processor of a terminal reads the computer instructions from the computer-readable storage medium, and executes the computer instructions, to cause the terminal to perform the virtual object control method provided in the optional implementations of the foregoing aspect.

After considering the specification and practicing the present disclosure, a person skilled in the art may easily conceive of other implementations of this application. This application is intended to cover any variations, uses, or adaptive changes of this application following the general principles of this application, and includes well-known knowledge and conventional technical means in the art and undisclosed in this application. The specification and the embodiments are merely considered as examples, and the actual scope and the spirit of this application are pointed out by the following claims.

It is to be understood that this application is not limited to the accurate structures that are described above and that are shown in the accompanying drawings, and modifications and changes may be made without departing from the scope of this application. The scope of this application is limited by the appended claims only. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A virtual object control method, performed by a computer device, the method comprising:
    displaying a virtual scene picture corresponding to a virtual scene, the virtual scene comprising a first virtual object and a second virtual object;
    controlling the first virtual object to launch a target virtual projectile at the second virtual object;
    generating a virtual gravitational source based on a position of the target virtual projectile in the virtual scene;
    determining a distance between the second virtual object and the virtual gravitational source; and
    when the distance between the second virtual object and the virtual gravitational source is less than a distance threshold, controlling the second virtual object to move toward the virtual gravitational source, further including:
        displaying a linear motion trajectory connecting a position of the second virtual object and a center position of the virtual gravitational source; and
        displaying a movement of the second virtual object toward the virtual gravitational source along the linear motion trajectory.

2. The method according to claim 1, wherein the generating the virtual gravitational source based on a position of the target virtual projectile comprises:
    acquiring a first movement trajectory of the target virtual projectile;
    determining a first trigger position based on the first movement trajectory of the target virtual projectile, the first trigger position being a maximum range position when no collision occurs during movement of the target virtual projectile along the first movement trajectory, or a position at which the target virtual projectile collides with an obstacle; and
    generating the virtual gravitational source at the first trigger position.

3. The method according to claim 2, wherein the generating the virtual gravitational source at the first trigger position comprises:
    generating the virtual gravitational source at the first trigger position when a volume of surrounding space of the first trigger position is greater than or equal to a volume of the virtual gravitational source.

4. The method according to claim 2, wherein the generating the virtual gravitational source at the first trigger position comprises:
    determining a second trigger position when a volume of surrounding space of the first trigger position is less than a volume of the virtual gravitational source, the second trigger position being a position on the first movement trajectory and for which a volume of surrounding space is greater than or equal to the volume of the virtual gravitational source; and
    generating the virtual gravitational source at the second trigger position.

5. The method according to claim 1, wherein the controlling the second virtual object to move toward the virtual gravitational source comprises:
    acquiring a first distance between a position of the second virtual object and a center position of the virtual gravitational source;
    determining, based on the distance between the second virtual object and the virtual gravitational source, an initial speed at which the second virtual object moves, the initial speed being inversely correlated with the first distance; and
    controlling the second virtual object to move toward the center position of the virtual gravitational source at the initial speed and a first acceleration along the linear motion trajectory.

6. The method according to claim 1, further comprising:
    when a duration for which the virtual gravitational source exists in the virtual scene reaches a first duration, displaying an explosion effect at the position corresponding to the virtual gravitational source in the virtual scene, and removing the virtual gravitational source from the virtual scene.

7. The method according to claim 1, further comprising:
    modifying a first attribute value of the second virtual object to 0 when the second virtual object moves to the center position of the virtual gravitational source along the linear motion trajectory.

8. The method according to claim 1, wherein the controlling the second virtual object to move toward the virtual gravitational source comprises:
    acquiring a first direction in which a center position of the virtual gravitational source faces relative to the second virtual object;

determining, based on the first direction, a first action of the second virtual object during its movement toward the center position of the virtual gravitational source; and controlling, based on the first action, the second virtual object to move toward the center position of the virtual gravitational source along the linear motion trajectory.

9. A computer device, comprising a processor and a memory, the memory storing at least one computer program, the computer program being loaded and executed by the processor and causing the computer device to implement a virtual object control method including:

displaying a virtual scene picture corresponding to a virtual scene, the virtual scene comprising a first virtual object and a second virtual object;

controlling the first virtual object to launch a target virtual projectile at the second virtual object;

generating a virtual gravitational source based on a position of the target virtual projectile in the virtual scene;

determining a distance between the second virtual object and the virtual gravitational source; and when the distance between the second virtual object and the virtual gravitational source is less than a distance threshold, controlling the second virtual object to move toward the virtual gravitational source, further including:

displaying a linear motion trajectory connecting a position of the second virtual object and a center position of the virtual gravitational source; and displaying a movement of the second virtual object toward the virtual gravitational source along the linear motion trajectory.

10. The computer device according to claim 9, wherein the generating the virtual gravitational source based on a position of the target virtual projectile comprises:

acquiring a first movement trajectory of the target virtual projectile;

determining a first trigger position based on the first movement trajectory of the target virtual projectile, the first trigger position being a maximum range position when no collision occurs during movement of the target virtual projectile along the first movement trajectory, or a position at which the target virtual projectile collides with an obstacle; and generating the virtual gravitational source at the first trigger position.

11. The computer device according to claim 10, wherein the generating the virtual gravitational source at the first trigger position comprises:

generating the virtual gravitational source at the first trigger position when a volume of surrounding space of the first trigger position is greater than or equal to a volume of the virtual gravitational source.

12. The computer device according to claim 10, wherein the generating the virtual gravitational source at the first trigger position comprises:

determining a second trigger position when a volume of surrounding space of the first trigger position is less than a volume of the virtual gravitational source, the second trigger position being a position on the first movement trajectory and for which a volume of surrounding space is greater than or equal to the volume of the virtual gravitational source; and generating the virtual gravitational source at the second trigger position.

13. The computer device according to claim 9, wherein the controlling the second virtual object to move toward the virtual gravitational source comprises:

acquiring a first distance between a position of the second virtual object and a center position of the virtual gravitational source;

determining, based on the distance between the second virtual object and the virtual gravitational source, an initial speed at which the second virtual object moves, the initial speed being inversely correlated with the first distance; and controlling the second virtual object to move toward the center position of the virtual gravitational source at the initial speed and a first acceleration along the linear motion trajectory.

14. The computer device according to claim 9, wherein the method further comprises:

when a duration for which the virtual gravitational source exists in the virtual scene reaches a first duration, displaying an explosion effect at the position corresponding to the virtual gravitational source in the virtual scene, and removing the virtual gravitational source from the virtual scene.

15. The computer device according to claim 9, wherein the method further comprises:

modifying a first attribute value of the second virtual object to 0 when the second virtual object moves to the center position of the virtual gravitational source along the linear motion trajectory.

16. A non-transitory computer-readable storage medium, storing at least one computer program, the computer program being loaded and executed by a processor of a computer device and causing the computer device to implement a virtual object control method including:

displaying a virtual scene picture corresponding to a virtual scene, the virtual scene comprising a first virtual object and a second virtual object;

controlling the first virtual object to launch a target virtual projectile at the second virtual object;

generating a virtual gravitational source based on a position of the target virtual projectile in the virtual scene;

determining a distance between the second virtual object and the virtual gravitational source; and when the distance between the second virtual object and the virtual gravitational source is less than a distance threshold, controlling the second virtual object to move toward the virtual gravitational source, further including:

displaying a linear motion trajectory connecting a position of the second virtual object and a center position of the virtual gravitational source; and displaying a movement of the second virtual object toward the virtual gravitational source along the linear motion trajectory.

17. The non-transitory computer-readable storage medium according to claim 16, wherein the generating the virtual gravitational source based on a position of the target virtual projectile comprises:

acquiring a first movement trajectory of the target virtual projectile;

determining a first trigger position based on the first movement trajectory of the target virtual projectile, the first trigger position being a maximum range position when no collision occurs during movement of the target virtual projectile along the first movement trajectory, or a position at which the target virtual projectile collides with an obstacle; and generating the virtual gravitational source at the first trigger position.

18. The non-transitory computer-readable storage medium according to claim 16, wherein the controlling the second virtual object to move toward the virtual gravitational source comprises:
   determining, based on the distance between the second virtual object and the virtual gravitational source, an initial speed at which the second virtual object moves, the initial speed being inversely correlated with the first distance; and
   controlling the second virtual object to move toward the center position of the virtual gravitational source at the initial speed and a first acceleration along the linear motion trajectory.

19. The non-transitory computer-readable storage medium according to claim 16, wherein the method further comprises:
   when a duration for which the virtual gravitational source exists in the virtual scene reaches a first duration, displaying an explosion effect at the position corresponding to the virtual gravitational source in the virtual scene, and removing the virtual gravitational source from the virtual scene.

20. The non-transitory computer-readable storage medium according to claim 16, wherein the method further comprises:
   modifying a first attribute value of the second virtual object to 0 when the second virtual object moves to the center position of the virtual gravitational source along the linear motion trajectory.

* * * * *